(12) United States Patent
Kobashi et al.

(10) Patent No.: US 7,847,971 B2
(45) Date of Patent: Dec. 7, 2010

(54) LAYOUT PROCESSING METHOD, INFORMATION PROCESSING APPARATUS, AND COMPUTER PROGRAM

(75) Inventors: Kazufumi Kobashi, Yokohama (JP); Emiko Kamiyama, Yokohama (JP); Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1125 days.

(21) Appl. No.: 11/211,469

(22) Filed: Aug. 26, 2005

(65) Prior Publication Data

US 2006/0050287 A1 Mar. 9, 2006

(30) Foreign Application Priority Data

Aug. 31, 2004 (JP) ............................. 2004-252897

(51) Int. Cl.
*G06F 17/00* (2006.01)
(52) U.S. Cl. ............... 358/1.18; 715/225; 715/240; 715/244; 715/246; 715/252
(58) Field of Classification Search ............... 358/1.15, 358/1.18, 1.1; 715/517, 520, 521
See application file for complete search history.

(56) References Cited

U.S. PATENT DOCUMENTS

| | | | | |
|---|---|---|---|---|
| 5,845,303 A | * | 12/1998 | Templeman | ............... 715/255 |
| 6,470,016 B1 | * | 10/2002 | Kalkunte et al. | ....... 370/395.41 |
| 6,584,480 B1 | * | 6/2003 | Ferrel et al. | ................. 715/205 |
| 6,760,043 B2 | * | 7/2004 | Markel | ....................... 715/717 |
| 6,826,727 B1 | * | 11/2004 | Mohr et al. | ................. 715/235 |
| 2002/0010707 A1 | * | 1/2002 | Chang et al. | ................ 707/500 |
| 2004/0135813 A1 | * | 7/2004 | Kanai | ......................... 345/781 |
| 2005/0172226 A1 | | 8/2005 | Kobashi et al. | |
| 2006/0044615 A1 | | 3/2006 | Kobashi et al. | |

FOREIGN PATENT DOCUMENTS

JP 7-129658 5/1995

OTHER PUBLICATIONS

Halvorso, Michael, "Microsoft Office XP Professional Office Manual," pp. 854-863, Nikkei BP Soft Press (JP) (including partial translation).

* cited by examiner

*Primary Examiner*—Mark K Zimmerman
*Assistant Examiner*—Haris Sabah
(74) *Attorney, Agent, or Firm*—Fitzpatrick, Cella, Harper & Scinto

(57) ABSTRACT

A layout processing method changes the layout of a template having a plurality of data areas in accordance with contents data to be assigned in each of the plurality of data areas. The method includes a displaying step, first and second setting steps, and a layout step. In the layout step, the size of a first data area is maintained, changed, or expanded based on the size of contents data assigned in the first data area and based on changes in the size of a second data area associated with the first data area. An information processing apparatus and a control program stored on a computer-readable medium are also provided.

8 Claims, 31 Drawing Sheets

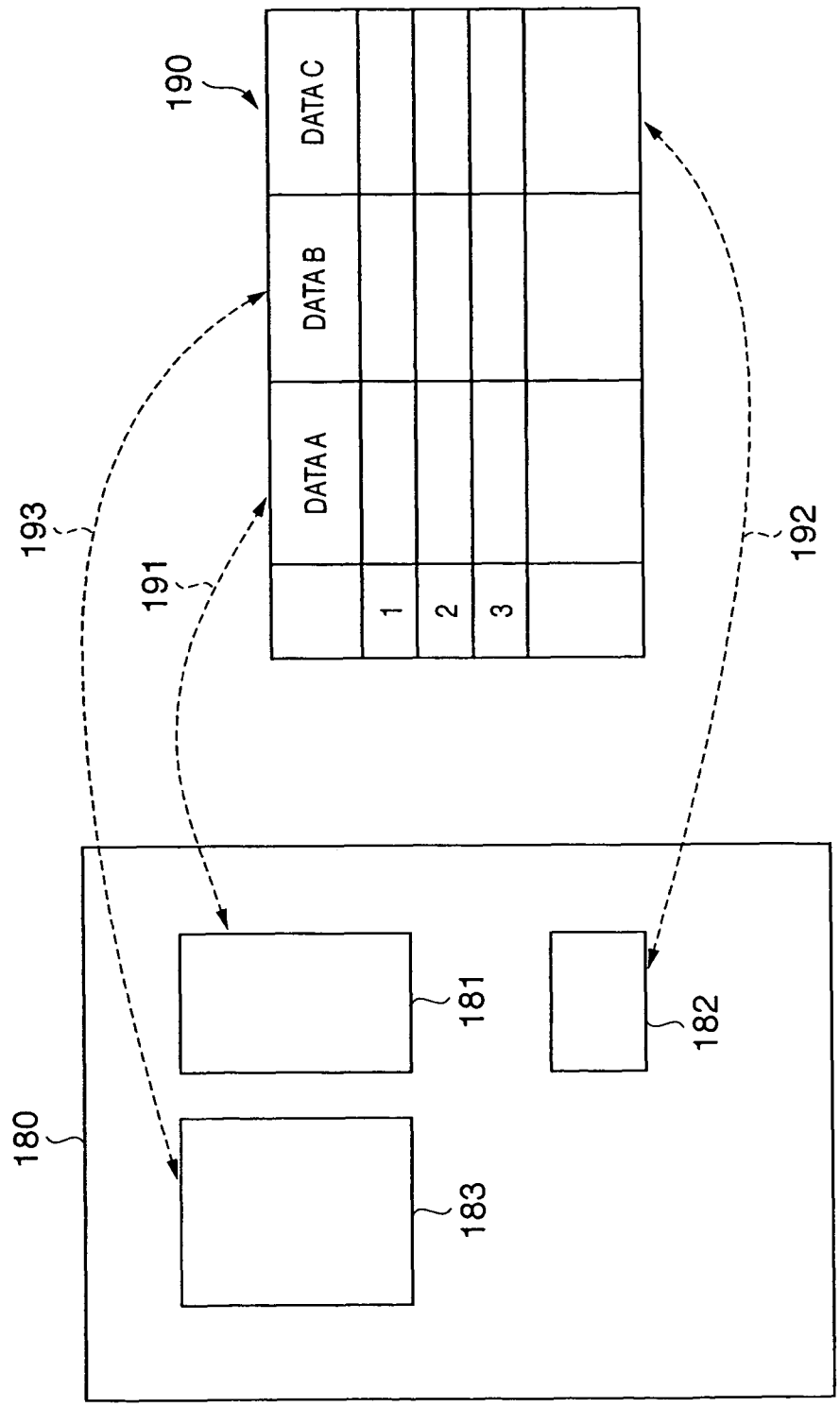

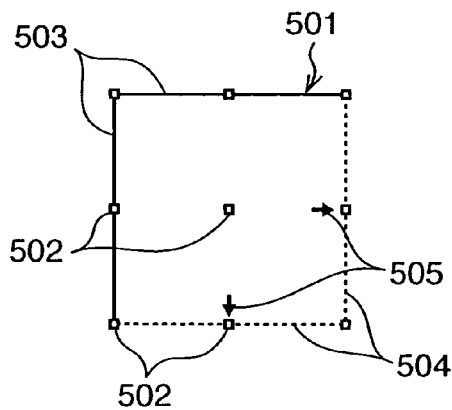
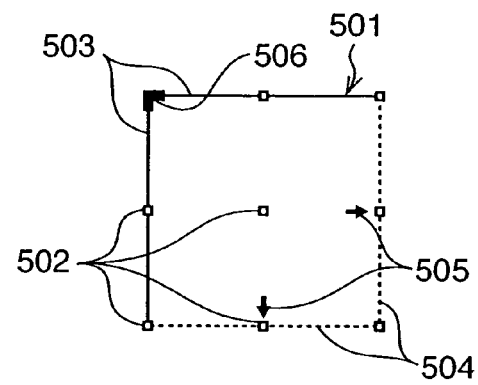
FIG. 5A          FIG. 5B
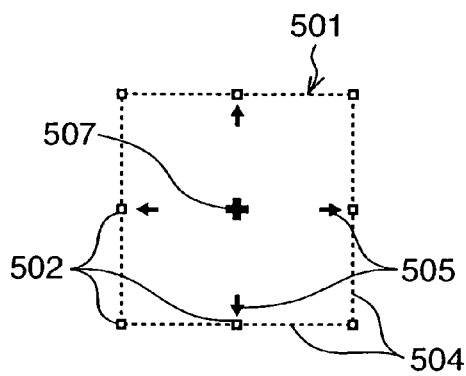
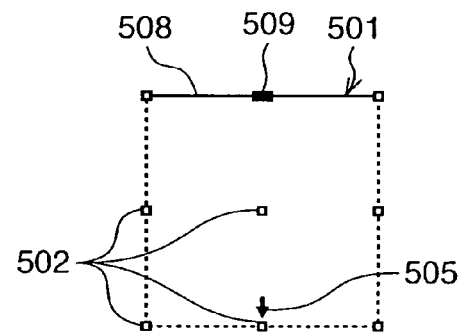
FIG. 5C          FIG. 5D

BASIC SIZE PRIORITY

BASIC SIZE PRIORITY    CONTENTS SIZE PRIORITY

BASIC SIZE PRIORITY    CONTENTS SIZE PRIORITY

FIG. 21A
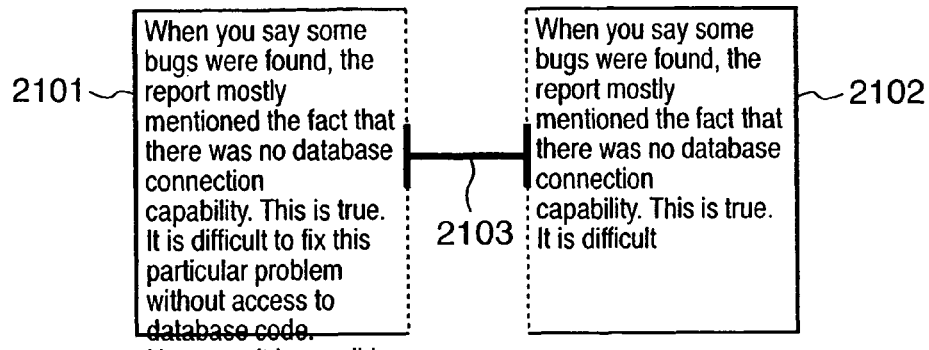
FIG. 21B
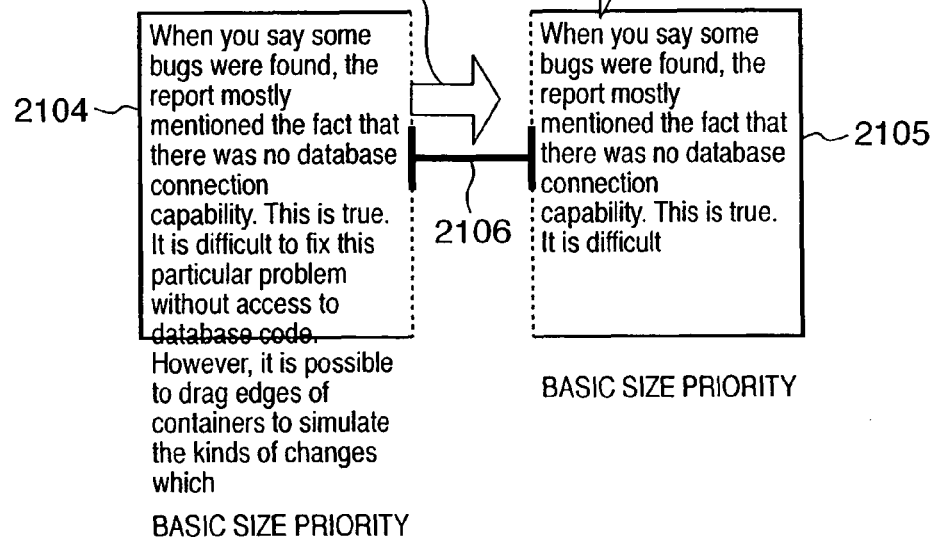
FIG. 21C

FIG. 27A

2701 — When you say some bugs were found, the report mostly mentioned the fact that there was no database connection capability.

CONTENTS SIZE PRIORITY

FIG. 27B

2702 — When you say some bugs were found, the report mostly mentioned the fact that there was no database connection capability.

2704

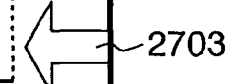 2703

FIG. 27C

2705 — When you say some bugs were found, the report mostly mentioned the fact that there was no database connection capability. This is true. It is difficult to fix this particular problem without access to ~~database code.~~
However, it is possible to drag edges of containers

When you say some bugs were found, the report mostly mentioned the fact that there was no database connection capability. This is true. It is difficult to fix this particular problem without access to database code. However, it is possible to drag edges of containers

2709 — When you say some bugs were found, the report mostly mentioned the fact that there was no database connection capability. This is true. It is difficult to fix this particular problem without access to

When you say some bugs were found, the report mostly mentioned the fact that there was no database connection capability. This is true. It is difficult to fix this particular problem without access to

2711  2713  2712

LAYOUT PROCESSING METHOD, INFORMATION PROCESSING APPARATUS, AND COMPUTER PROGRAM

FIELD OF THE INVENTION

The present invention relates to a technique of generating, editing, and printing a document containing texts and images and, more particularly, to generation, editing, and printing of a variable data document.

BACKGROUND OF THE INVENTION

Since the merchandise service life has decreased recently due to a variety of merchandise items, and the number of consumers with customization service orientation has increased along with the penetration of the Internet, the necessity of CRM (Customer Relationship Management) and one-to-one marketing has received a great deal of attention. These methods are very effective for purposes of increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Especially, along with the recent progress in DTP (DeskTop Publishing) technology and the spread of digital printers, variable print systems have been developed, which customize and output a document for each customer. Such a variable print system is required to create a customized document in which contents in quantity that changes for each customer are laid out in an optimum manner.

Generally, when such a customized document is to be created by a variable print system, containers are laid out on the document. A container indicates a partial area to draw a content (drawing content) and is sometimes called a field area. More specifically, containers are laid out on the document, and a database and the layout are associated with each other (each content in the database is associated with each container). With this operation, a customized document (document) is created. In this specification, such a document will be referred to as a variable data document.

In the variable print system, a content which is different for each customer can be inserted in each of the containers laid out. The size of data to be inserted in a content is flexible. If the size of a container is fixed, the following problem arises. For example, when text data having a size larger than the container size is inserted, the text cannot wholly be displayed in the container. Alternatively, when image data having a size larger than the container size is inserted, the image is partially missing. Such a problem is called overflow.

If the content is image data, the image may be reduced and drawn in the container. However, the image may be excessively small. There is also proposed a technique in which if text data whose size is larger than a fixed container size is inserted, the font size of the text is reduced to display the entire text in the container. However, if the font size is adjusted, it may be too small to balance the whole document, or the document may become difficult to read.

The "layout design apparatus" of Japanese Patent Laid-Open No. 7-129658 discloses an automatic layout technique to solve the above-described problems. In this technique, when the size of a container becomes large, the size of an adjacent container is reduced to maintain the interval between them.

According to the description of Japanese Patent Laid-Open No. 7-129658 described above, the container size increases in accordance with input of a text. However, when the size of a container becomes large, the size of an adjacent container is reduced to maintain the interval between them. For this reason, as the amount of the input text increases, the adjacent container is continuously reduced.

Additionally, in Japanese Patent Laid-Open No. 7-129658, no variable print system for creating a document customized for each customer by inserting contents data while associating the above-described database with each container is taken into consideration.

As a layout method considering variable data print, a fixed container is created, and contents data is inserted in it. However, when a container with a fixed size is used, and contents data having a larger size than the container is inserted, overflow occurs. If the data is forcibly inserted by reducing the font size, the font size becomes too small. The container size may be increased or decreased in accordance with the size of contents data to be inserted. However, when a plurality of containers are associated, and the size of one container is increased, the associated containers must reduce their sizes as the size of that container increases. Hence, no layout processing considering the size balance between containers can be executed.

As a layout method considering the size balance between a plurality of containers associated with each other, when the size of each container is changed in accordance with the size of contents data inserted in it, layout processing may be executed by adjusting the change amount of each container size. The associated containers can be subjected to layout processing considering the size balance.

In this layout method, however, the container size is always changed in accordance with the size of inserted contents data. Even when a preset container size needs to be maintained for the sake of layout, the container size is changed regardless of user's desire.

For example, in inserting contents data having a size larger than the container size, the container size is preferably increased in accordance with the size of the contents data because overflow or font size must be taken into consideration. However, in inserting contents data with a size smaller than the container size, not all users want to reduce the container size in accordance with the contents data. For example, the user may want to maintain the preset container size.

As described above, even when some containers should be laid out by using a preset standard size, the container sizes are always changed in accordance with inserted contents data, and no layout desired by the user is obtained.

SUMMARY OF THE INVENTION

The present invention has been made in consideration of the above problems, and has as its object to implement layout processing which reflects user's desire by setting, for each container, a layout attribute capable of appropriately maintaining the size of a data area (container) set at the time of layout.

According to one aspect of the present invention, there is provided a layout processing method of dynamically changing a layout of a template having a plurality of data areas in accordance with contents data to be inserted in each of the plurality of data areas, comprising: a determination step of determining whether to change a size of the data area from a standard size in setting the layout so as to adapt the data area to a size of the contents data inserted in the data area; and a layout determination step of, when it is determined in the determination step that the size of the data area should be changed from the standard size, determining the size of the data area in accordance with the size of the contents data inserted in the data area, and when it is determined in the determination step that the size of the data area should not be changed from the standard size, determining the size of the data area by using the standard size, wherein in the determination step, for a data area for which a first layout attribute is set, it is determined that the size of the data area should not be changed from the standard size when the size of contents data inserted in the data area is smaller than the standard size of the data area and the data area is not influenced by a data area associated with the data area by a link.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1C is a view for explaining the outline of variable data print;

FIGS. 5A to 5D are views for explaining container rules according to the embodiment;

FIGS. 21A to 21C are views showing an example of layout processing when containers with basic size priority are associated;

FIGS. 27A to 27F are views for explaining a layout method with contents size priority.

DETAILED DESCRIPTION OF THE PREFERRED EMBODIMENT

A preferred embodiment of the present invention will now be described in detail in accordance with the accompanying drawings.

<System Arrangement>

Figure 1A:
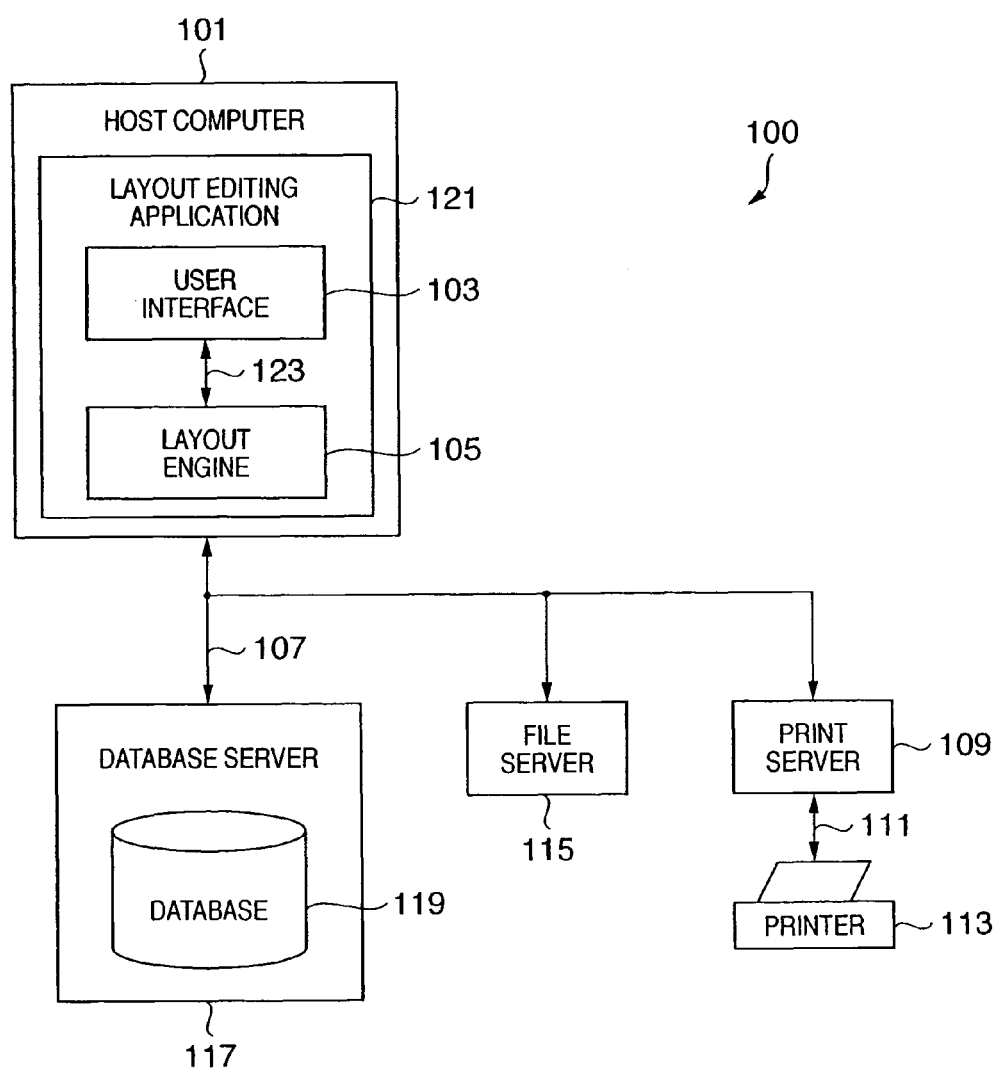
FIG. 1A is a block diagram showing an arrangement of a variable print system according to an embodiment.
Figure 1B:
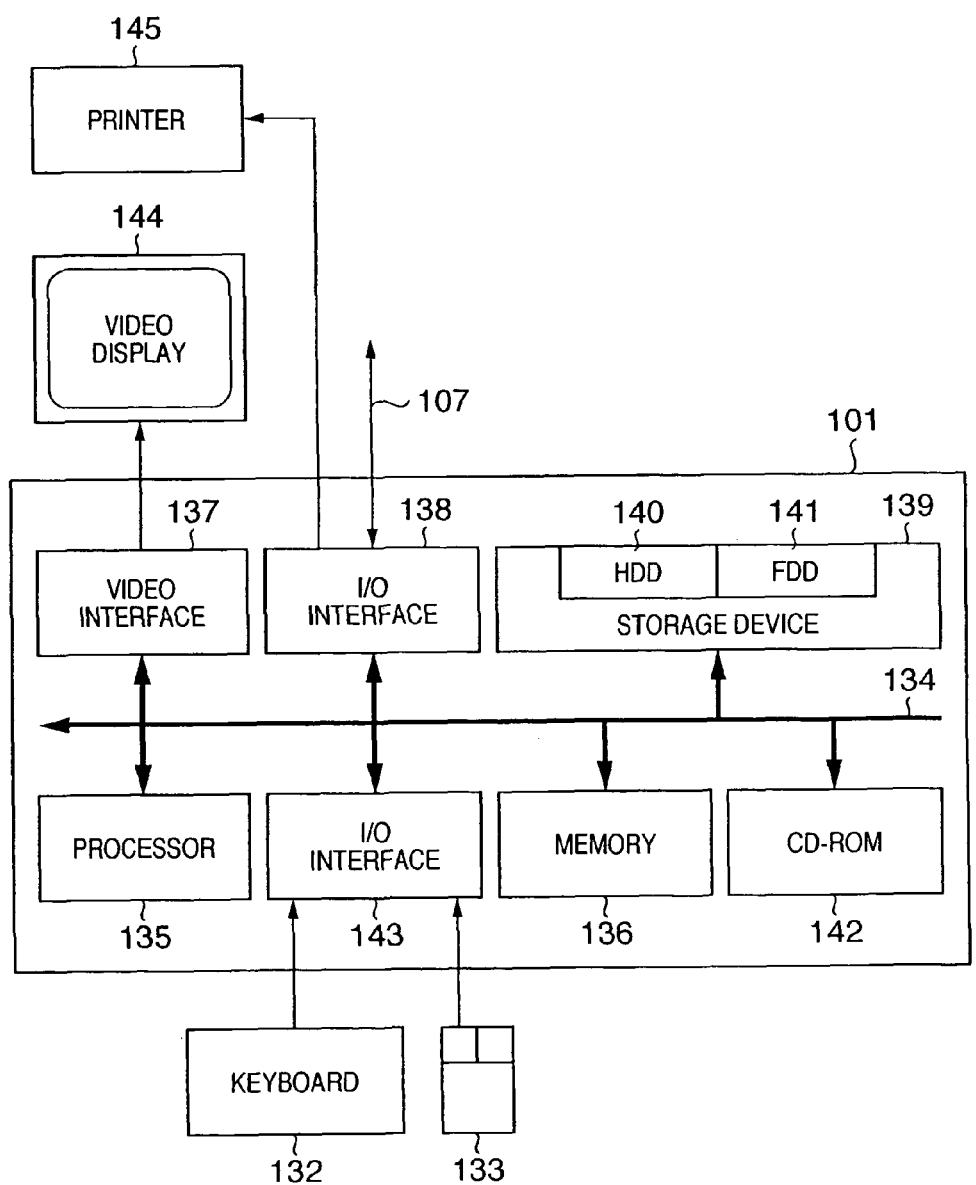
FIG. 1B is a block diagram showing the schematic arrangement of a host computer shown in FIG. 1.

The arrangement of a variable print system according to the embodiment will be described first with reference to FIGS. 1A and 1B. FIG. 1A is a block diagram showing an arrangement of a variable print system 100 to print a variable data document. FIG. 1B is a block diagram showing the arrangement of a host computer 101 shown in FIG. 1A in more detail. Variable print processing to be described in this embodiment is executed by the host computer 101 (including general-purpose computer modules) serving as a layout adjustment apparatus. The software of a layout editing application program 121 (layout adjustment program according to the present invention) executable on the system 100 is wholly or partially executed by the host computer 101. Especially, processing for layout editing or processing for printing a variable data document is implemented by the software executed by the host computer 101.

The layout editing application program 121 is stored in a computer-readable medium. The layout editing application program 121 is loaded from the computer-readable medium to a memory 136 of the host computer 101 and executed. The computer-readable medium which stores such software or computer program is a computer program product. When the computer program product is used by a computer, an apparatus suitable for layout editing or variable print of a document is provided.

As shown in FIG. 1B, pointing devices such as a keyboard 132 and a mouse 133 serving as input devices are connected to the host computer 101 through an input/output interface 143. A display device 144 serving as an output device is connected through a video interface 137. A local printer 145 or the like may be connected through an input/output interface 138. The input/output interface 138 also has a function of connecting the host computer 101 to a network 107. With this arrangement, the host computer 101 can be connected to another computer apparatus in the system 100 through the network. Typical examples of the network 107 are a local area network (LAN) and wide area network (WAN).

As shown in FIG. 1B, the host computer 101 includes at least one processor unit 135 and the memory unit 136 including, e.g., a semiconductor random access memory (RAM) or read-only memory (ROM). A storage device 139 includes a hard disk drive 140 and floppy (registered trademark) disk drive 141 capable of transmitting/receiving data to/from the computer-readably medium which stores the program. Although not illustrated in FIG. 1B, a magnetic tape drive can also be used as the storage device 139. A CD-ROM drive 142 is provided as a nonvolatile data source (the computer program may be provided by a CD-ROM, as a matter of course).

The host computer 101 uses the components 135 to 143 of the computer module 101, which communicate through an interconnection bus 134, typically in a form according to an operating system such as GNU/LINUX or Microsoft Windows (registered trademark) or by a method by the conventional operation mode of a computer system formed by a known associated technique. That is, the above-described components 135 to 143 are communicably connected through the bus 134 and used by the operating system installed in the host computer 101.

Examples of the host computer 101 shown in FIG. 1B are an IBM-compatible PC or Sparcstation available from SUN, or a computer system including them.

<Outline of Layout Editing Application>

In this embodiment, the layout editing application program 121 is resident in the hard disk drive 140, and its execution or reading is controlled by the processor 135. Data of the layout editing application program 121 that are fetched from the intermediate storage device and the network 107 use the semiconductor memory 136 in response to the hard disk drive 140.

As an example, the encoded program of the layout editing application 121 is stored in a CD-ROM or floppy (registered trademark) disk, loaded through the corresponding drive 142 to 141, and installed in the hard disk drive 140. As another example, the layout editing application program 121 may be loaded from the network 107 into the host computer 101 and installed in the hard disk drive 140. The software may be loaded in the host computer 101 by using a magnetic tape, ROM, integrated circuit, magnetooptical disk, wireless communication using infrared rays between the host computer 101 and another device, a computer-readable card such as a PCMCIA card, or another appropriate computer including e-mail communication, an intranet, or the Internet having recording information on a WEB site. These are examples of computer-readable media. Any other computer-readable medium may be used.

Referring to FIG. 1A, the layout editing application 121 of the present invention causes the computer to execute variable print (also called variable data print (VDP)) and includes two software components, i.e., a layout engine 105 and user interface 103. The layout engine 105 is a software component which loads each record of variable data stored in a database 119 in accordance with the constraints of the sizes and positions given to containers (rectangular ranges) as partial areas and calculates, on the basis of the read data and the constraints of the containers, the size and position of each container in which the readout data should be inserted. In this embodiment, the layout engine 105 also executes processing of drawing data assigned to a container to generate an image of a variable data document. However, the present invention is not limited to this. The layout engine 105 may run as an application to determine the size and position of each partial area (container) and output drawing information to a printer driver (not shown). Accordingly, the printer driver may execute image drawing processing of a variable data document and generate print data. The user interface 103 allows a user to set the layout and attribute of each container and causes him/her to create a document template. In addition, the user interface 103 provides a mechanism to associate each container in the document template with a data source. The user interface 103 and layout engine 105 communicate with each other through a communication channel 123.

FIG. 1C is a view for explaining the outline of variable data print according to this embodiment. A plurality of containers 181 to 183 are laid out on a page in accordance with an operation instruction from the user through the user interface module 103 (to be referred to as the user interface 103 hereinafter) of the layout editing application 121. Then, constraints about the position and size are given to each container, thereby generating a document template 180. The user interface 103 also associates the document template 180 with a data source 190 and each container with a data field in the data source 190. The association information representing the association between each container and a data field in the data source 190 is described in the document template. The document template is stored in the HDD 140. The data source 190 is a file in which item data is described for each record. The data source 190 is stored in the HDD 140. In accordance with a print instruction or preview instruction from the user, the layout engine 105 reads out the data associated by the association information from the data source 190, inserts the data in the containers 181 to 183 of the document template for each record (for example, data fields A to C of data record 1 are inserted in the containers 181 to 183), and adjusts the size of each container in accordance with the inserted data (layout adjustment). When a preview instruction is input, a layout-adjusted document image is generated and output so that the image is displayed on the screen of the video display 144 as a preview. When a print instruction is input, a document image generated by using the layout engine 105 or printer driver is output to the print server 109 as print data. Variable data print is implemented by sequentially processing data records 1, 2, 3, . . . .

The data source (190) for document generation may be, e.g., the general database 119 on a database server 117 formed by another computer which is making the database application run. In this case, the host computer 101 can acquire the data source by communicating with the database server 117 through the network 107. The document template (180) for variable data print, which is generated by the layout editing application 121, is stored in the host computer 101 or a file server 115 formed by another computer. As described above with reference to FIG. 1C, the layout engine 105 of the layout editing application 121 generates a variable data document containing a document template merged with data. The document is stored in the local file system of the host computer 101 or in the file server 115, or transmitted to and printed by a printer 113. The print server 109 is a computer to provide a network function to a printer which is not connected directly to the network. The print server 109 and printer 113 are connected through a general communication channel 111.

<Another System Arrangement>

Figure 2:
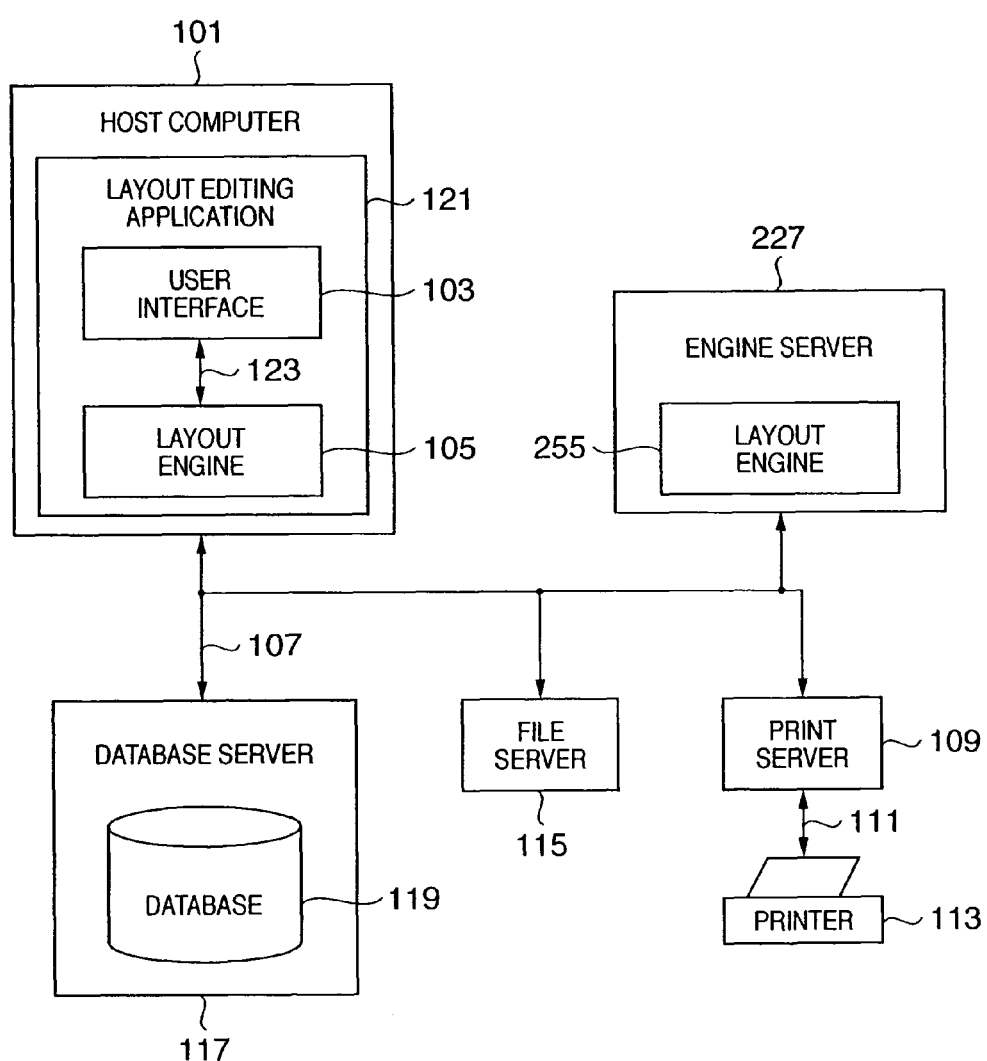
FIG. 2 is a block diagram showing another arrangement of the variable print system according to the embodiment.

FIG. 2 is a block diagram similar to FIG. 1A. An engine server 227 is added. A layout engine 225 stored in the engine server 227 is a separate version of the layout engine 105. As the engine server 227, a general computer is used. The layout engine 225 combines a document template stored in the file server 115 with data stored in the database 119 to generate a variable data document for printing or another purpose. This operation is requested through the user interface 103.

<Description of Layout Editing Application>

The layout editing application 121 will be described below.

[Main Window]

Figure 3:
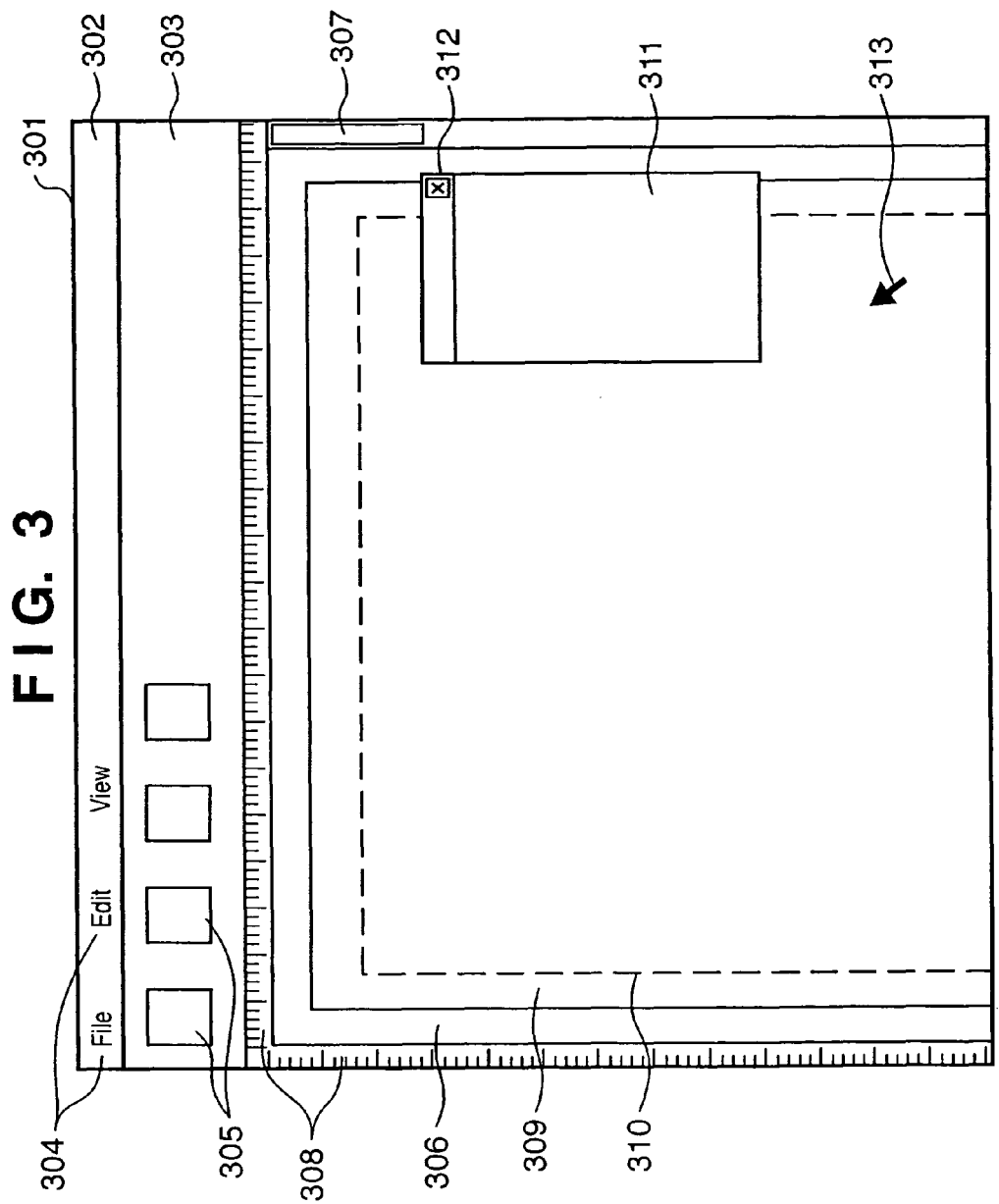
FIG. 3 is a view showing an example of a user interface according to the embodiment, which includes a menu bar, tool bar, work area, and floating palette.

At the time of operation, the user interface 103 causes the video display 144 to display a user interface window formed by an application window 301 shown in FIG. 3. The window 301 has a menu bar 302, tool bar 303, work area 306, and optional palette 311. The menu bar 302 and tool bar 303 can be set in a non-display state or moved to various positions on the screen. The position of the work area 306 can be moved by operating the mouse 133. The palette 311 is an option. A cursor/pointer device 313 represents a position indicated by the mouse 133.

The menu bar 302 as a known technique has a number of menu items 304 extended under the layer of menu options.

The tool bar 303 has a number of tool buttons and widgets 305 which can be set in a non-display state or display state by a special mode of the application.

A ruler 308 is an option and is used to indicate the position of a pointer, page, line, margin guide, container, or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

Figure 4:
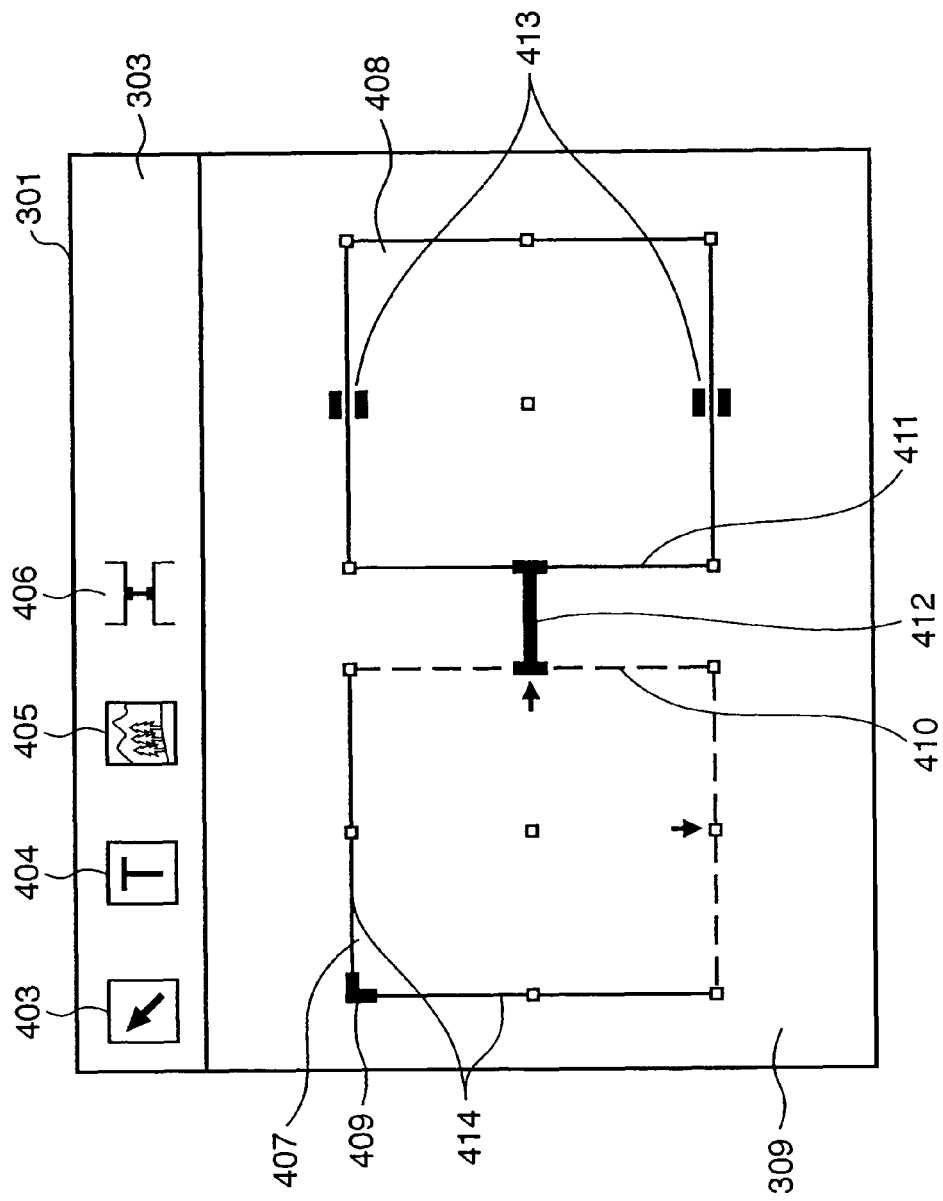
FIG. 4 is a view showing a display example of containers in the user interface.

User-selectable "buttons" as shown in FIG. 4 are laid out on the tool bar 303.

(1) Select tool button 403: This button is used for edge selection, movement, size change, resize, or lock/unlock of a container. A container is selected by dragging a select box around the container. When a plurality of containers are selected while keeping the CTRL key pressed, the plurality of containers can be selected.

(2) Text container tool button 404: This button is used to create a container having a static or variable text.

(3) Image container tool button 405: This button is used to create a container having a static or variable image.

(4) Link tool button 406: This button is used to create a link to associate containers with each other. This button is also used to control the distance of the link.

In the application window 301 of the layout editing application 121 shown in FIG. 3, when containers and links are laid out in a page, a basic layout can be determined. The basic layout is a layout as a base of variable data print. When containers in the basic layout are fixed containers, all record print results have the same layout. When containers in the basic layout are flexible containers, the size or position of each container varies within the constraint range (to be described later) in accordance with the amount or size of data inserted for each record. The document template created by the layout editing application 121 is strictly used to determine the basic layout. When a flexible container is included, the final layout of a printed product is adjusted in accordance with read data.

[Document Template]

Referring to FIG. 3, the work area 306 is used to display and edit the design of the document template (180: basic layout). The document template may simply be referred to a template. The outline of a document to be printed can be presented to the user in the process of causing him/her to design the document template. Accordingly, the user can easily understand how the document merged with the data source (190) changes on the basis of the amount and size of variable data.

When the data source is associated with the document template, a corresponding variable text or image is displayed in each container laid out so that a preview of the current document can be obtained.

In the document template creation mode, visual keys (e.g., frame lines of containers, anchors, sliders, and links) which express the document structure and variable data containers in the document template are always displayed. In the preview mode in which variable data are inserted, the visual keys are displayed when the cursor is moved onto a container, or a container is selected.

The work area 306 includes a scroll bar 307, the optional ruler 308, and a document template 309. The document template 309 can indicate the presence of a plurality of pages. The document template 309 indicates the document template 180 shown in FIG. 1C.

The page size of a given document template is designated by the user by using a known technique. For example, "Page Setup" is selected from "File" of the menu to display a dialogue to set the page size, on which the page size designated by the user is reflected. The actual number of pages of each document can change depending on the variable data in the associated data source. This is because when a field like a flexible table whose size is changed in accordance with the amount of variable data is set in the document template, and variable data which cannot be fit in one page is read, an additional page is automatically created.

A border 310 shown in each page is an arbitrary page margin representing the maximum width of an object printable on the page.

FIG. 4 is a view showing examples of objects which can be displayed on the document template 309 of one page. The objects include containers 407 and 408, an arbitrarily applied anchor icon 409, fixed edges 411 and 414, an unfixed edge 410, a link 412, and sliders 413. The anchor icon 409 can be set at a corner or edge of the rectangle of a container or the center of a container. When the anchor icon 409 is set, the position of the set point is fixed. That is, in the example shown in FIG. 4, the anchor icon 409 is set at the upper left corner of the container 407. When variable data is inserted in the container 407, and the image size or text amount of the variable data is large, the container can be enlarged to the right and lower edges. When the anchor icon 409 is set on an edge, the edge is fixed. The container can be enlarged in the directions of the three remaining edges. When the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the edges on which the sliders are set.

[Container]

A container will be described. A container is a space (called a partial area or data area) where a fixed or flexible text or image is inserted from a variable data file to the document template and drawn. A container is laid out together with other containers and objects, as shown in FIG. 4. Movement, size adjustment, and re-creation of the container are done by operating the mouse 133 on the basis of an operation instruction from the user through the user interface window. Data inserted in the container is called a content or contents data.

More exactly, the container has a set of settings, visual expression, interaction, and editing operation. The definition of a container according to this embodiment will be described below.

(1) A container has a fixed or flexible content. A flexible content can be regarded as dynamic because data acquired from the data source can change for each document, i.e., each record. In this embodiment, however, animated contents and contents which change over time by another method are not assumed as a flexible content because they are not suitable for printing. A fixed content is displayed in a similar manner in all documents generated by using containers. However, when a link is set between a fixed content and a flexible content, the fixed content may be affected by the flexible content and change its position in each document.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data from the data source in generating a document. The ornament function can visually be recognized on a printed output product for all fixed contents. A flexible content provides display of specific data from the data source. This expression of the container can be, e.g., printed or displayed on the screen of the video display 144, or subjected to both printing and display.

(4) A container has a user interface as a visual key, as shown in FIG. 4. A container has, e.g., an interactive graphical user interface (GUI) to edit the container or set display. Each element of the GUI is displayed on the screen of the video display 144 but not printed in the document. The user interface 103 of the layout editing application 121 has a function of displaying some of the ornament functions of a container such as the background color and font and allowing editing and display of settings of the container.

[Constraints of Container]

Each container has constraints about control for the manner contents displayed by the respective documents are combined. These constraints (including combining a fixed or flexible content with a container) are used as a principal method of causing the user to control the generations of a number of documents from one document template. An example of the constraint is "the maximum height of the content of this container is 4 inches". Another example of the constraint is "the left edge of the content of the container must be displayed at the same horizontal position in each document". The contents described here indicate various methods of displaying and editing such constraints by using the GUI.

A contents place holder which designates the layout of a fixed content like an image having a defined place on a page is well-known in the digital print technique. Each container has a position and size. The containers are edited and displayed by a method as a known technique. The following description will be made with a focus on display and editing in a method specialized to variable data print.

When containers are used, the user can designate the sizes (drawing sizes) and positions of contents in a document. Since many kinds of documents are generated from one document template, a number of possibilities and constraints are set for the containers. To set (designate) and display them, a predetermined user interface is used.

The edges of one container define the virtual border of an associated content displayed in the document. Hence, discussion about the left edge of a container is equivalent to discussion about the leftmost edge of an area where an associated content can be displayed in each document. Similarly, discussion about the height of a container can be understood as discussion about the constraint of the height of an associated content in the generated document. In this specification, they are clearly distinguished in discussing the edge or size of a container by referring to the user interface 103.

In the following description, the term "fixed", which defines a certain value used to restrict display of a content, applies to all documents in the same way.

(1) When the width of a container is fixed, the width to be assigned to an associated content is the same in all documents.

(2) When the height of a container is fixed, the height to be assigned to an associated content is the same in all documents.

(3) When a distance (link length) is fixed, the designated distance is a constraint in all documents.

(4) When the left and right edges of a container are fixed, the horizontal positions of edges related to the page are the same in all documents. However, the height or vertical position of the container can change. For example, when the left edge of a container is fixed, the left edge of an associated content is displayed at the same horizontal position in all documents. However, the content may be displayed on the upper edge of the page in a document and on the lower edge of the page in another document.

(5) When the upper and lower edges of a container are fixed, the vertical positions of edges in the page are the same in all documents. However, the width or horizontal position of the container can change for each document.

(6) The vertical axis of a container is a virtual vertical line which is parallel to the right and left edges of the container and is located at the intermediate position therebetween. When the vertical axis of the container is fixed, the average of the horizontal positions of the left and right edges of the container (i.e., the central position between the left and right edges) is the same in all documents. In this constraint, the width of the container can change. However, the vertical axis is located at the same horizontal position in all of documents independently of whether the left and right edges are nearest to or farthest from the vertical axis. Note that the height and vertical position of the container are not affected by this constraint.

(7) Similarly, when the horizontal axis is fixed, the average of the upper and lower edges of a container is located at the same vertical position. However, the width and horizontal position of the container are not affected by this constraint.

(8) When both the horizontal axis and the vertical axis are fixed, the central position of the container is fixed. However, the width and height of the container are not affected by this constraint.

(9) When the angular position of a container, the intermediate position of an edge of a container, or the central position of a container is fixed, the position is the same in all documents. For example, when the upper left corner of a container is fixed, the upper left position of the container laid out is the same in all documents.

(10) The vertical edges or vertical axis can be fixed in association with the left or right edge of the page, left or right page margin, or another horizontal position. Similarly, the horizontal edges or horizontal axis can be fixed in association with the upper or lower edge of the page, upper or lower page margin, or another vertical position.

A term opposite to "fixed" is "flexible" which indicates that an edge, axis, corner, or intermediate position of a container or a document constraint can change between documents (between records). For example, in a page, the layout is expected to dynamically change depending on the size or amount of variable data. However, the user may want that the size or position of a specific container is fixed, or the four corners of a container at a corner of the page is fixed. For this purpose, the layout editing application 121 can appropriately set, for each container (partial area), whether to fix or change an edge, axis, corner, or intermediate position. Hence, the user can create a desired basic layout in determining the basic layout of the document template 180.

[Display/Editing of Container]—

Method of Creating New Container

Containers are described in two types, i.e., text container and image container. A text container has a text and an embedded image. An image container has only an image.

As shown in FIG. 4, a new text container or image container is created on the document template 309 by clicking the mouse 133 on the text container tool 404 or image container tool 405 and dragging a rectangle on the document template 309.

Alternatively, a container may be created by activating the appropriate tool 404 or 405 and simply clicking the mouse on the document template 309. In this case, a container having a default size is inserted on the template in accordance with the click operation of the mouse 133. In addition, a dialogue box or prompt to set the size of the new container is provided. The container size can be set by various methods. For example, the size may be defined automatically in advance, or a container may be created and laid out by a calculated schema. When the generated container is selected by an input means such as the mouse, and its properties are displayed by clicking on the right button of the mouse, the container property dialogue is displayed so that constraints for the container can be set. In the container property dialogue UI (corresponding to a partial area setting means), various kinds of constraints described above can be set. In the container property dialogue, the size (width and height) and position of the container can be set. To set a flexible size, the basic pattern (standard size and reference position) of the container is set. In addition, the maximum container size (width and height) and the minimum container size (width and height) can be set. The container size set by using the above-described means is the standard size in setting the layout. Variable data (contents data) is inserted in the container set at this time. The standard size may be changed in accordance with the size of inserted contents data or a change in size of an associated container. This will be described later in detail.

[Container Display Method]

FIGS. 5A to 5D show display rules about the edges of a container.

To express the state of an edge of a container, the application 121 expresses an edge by using a solid line (item 503) or a dotted line (504). In addition, the application 121 uses anchors (line, shape, and icon indicated by 506, 507, and 509 drawn near the edges), handles (control points 502 drawn on or near the edges of the area for movement and correction), sliders (short parallel lines drawn on both edges of an edge, 403 in FIG. 4), enlarge/reduce icons (505), and colors.

The rules of the container display method shown in FIGS. 5A to 5D are as follows.

(1) To fix an edge, it is drawn by a solid line.

(2) When the width is fixed, the left and right edges are drawn by solid lines.

(3) When the height is fixed, the upper and lower edges are drawn by solid lines.

(4) The axes are not drawn.

(5) Enlarge/reduce icons are drawn near each of edges which are not drawn according to the rules (1) to (3). The edges are drawn by dotted lines.

(6) When the pair of vertical and horizontal edges or the pair of vertical axis and horizontal axis are fixed, an anchor is drawn at the intersection between them.

(7) When no anchor is drawn anywhere on a fixed edge, a slider is drawn at the center of the edge.

(8) When neither anchor nor slider is drawn for the pair of vertical and horizontal edges or the pair of vertical axis and horizontal axis, a handle is drawn at the intersection between them.

The lines defined by the rules (1), (2), and (3) are fixed or restricted, as described above, and drawn by solid lines. Flexible edges defined by the rule (5) are drawn by dotted lines. Fixed points defined by the rules (6), (7), and (8) represent anchors. Some fixed edges represent sliders. Remaining points represent handles.

In the above-described rules, higher priority is given to a constraint set by the user later. That is, when another constraint is set later, and it can affect edges which should be drawn in accordance with the above-described rules, the drawing contents of solid line or dotted lines are changed.

The location where a flexible edge is drawn depends on the content of the container. As will be described later, "dynamic calibration processing" is used, which indicates that a content is merged with a document template and made visible by the user interface. Alternative execution can be used by another means for determining the layout position of a flexible edge in the user interface or the content area of the container averaged in all documents.

These content expressions provide a graphical means for displaying the state of each edge of a container. The expressions can be interpreted in the following way.

(1) A dotted line indicates that the position of the edge in the document changes depending on the content of the container, like the edge 410 shown in FIG. 4.

(2) A solid line indicates that the edge is restricted because it is fixed (edge 414), or the width or height of the container is fixed (in the container 408, the four edges are indicated by solid lines so that both the width and height are fixed).

(3) An anchor indicates that the point where edges or axes cross is fixed. Hence, the anchor point appears at the horizontal and vertical positions in all documents. The anchor is fixed, as a matter of course. The icon 409 in FIG. 4 is an example of an anchor icon which indicates that the position at which the edges 414 cross is fixed.

(4) A slider indicates that the associated edge can be translated although it has a fixed length. For example, the sliders 413 in FIG. 4 indicate the content of the container 408 may be displayed on the left or right edge of a position represented by a specific diagram in the document. For example, when the image size or text amount of data inserted in the container 407 associated with the container 408 (a link is set between the containers) is small, the size of the container 407 becomes small. For this reason, the container 408 is slid (translated) to the left and laid out. When the size of the container 407 becomes large, the container 408 is slid conversely to the right and laid out.

Some or all of these icons and edges are drawn or not drawn depending on which tool or which container is selected/highlighted or activated. Generally, the container edges and icons are not drawn on a printed product because they are assistant tools for designing the document template.

As described above, settings for the basic pattern including the basic values, minimum values, and maximum values of the width and height of a container are displayed in a secondary dialogue window.

Referring to FIG. 5A, in a container 501, neither the width nor height is fixed (flexible). The fixed edges 503 are expressed by solid lines. The flexible edges 504 are expressed by dotted lines. The enlarge/reduce icons 505 represent the adjacent edges 504 are flexible. An indicator in another form may be used instead or additionally.

Referring to FIG. 5B, in the container 501, both the width and height are flexible. The anchor icon 506 is added to explicitly represent that the position of the corner at which the edges 503 cross is fixed.

Referring to FIG. 5C, in the container 501, both the width and height are flexible. In this state, the container can extend equally from the central point indicated by the arbitrary anchor icon 507. That is, the container 501 can be enlarged or reduced about the anchor icon 507. In enlargement/reduction, the layout is adjusted such that the anchor icon 507 is always located at the central point of the container 501.

Referring to FIG. 5D, although an upper edge 508 of the container 501 is fixed, both the width and height are flexible. The anchor icon 509 located at the center of the upper edge 508 is fixed. The left and right edges (502) of the container 501 enlarge or reduce the container about the central axis (vertical axis) extending perpendicularly through the anchor icon 509.

[Link]

A link indicates the association between a container and another container. The association indicates the distance between the containers. The layout of containers associated by a link is calculated in consideration of the influence of their layout change. The influence of their layout change here indicates a jostle (indicating a "pushing force" or "pulling force" to be described later) between containers which occurs when the standard size of the container is changed by inserted contents data. Reference numeral 412 in FIG. 4 denotes a link which associates the containers 407 and 408 in FIG. 4. The link setting method and the layout calculation method of containers associated by a link will be described later.

[Link Setting Method]

Figure 6:
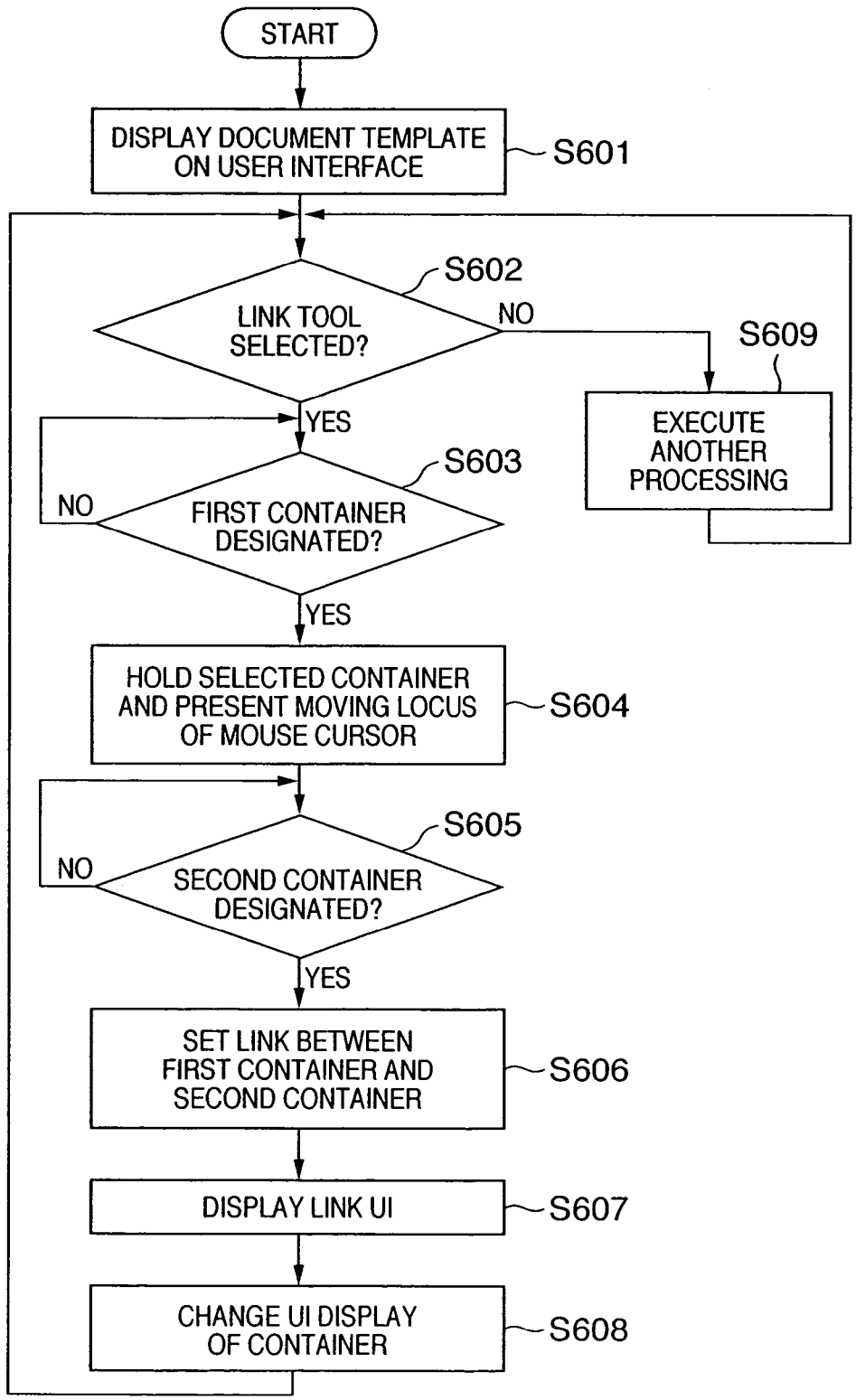
FIG. 6 is a flowchart for explaining link creation processing according to the embodiment.
Figure 7A:
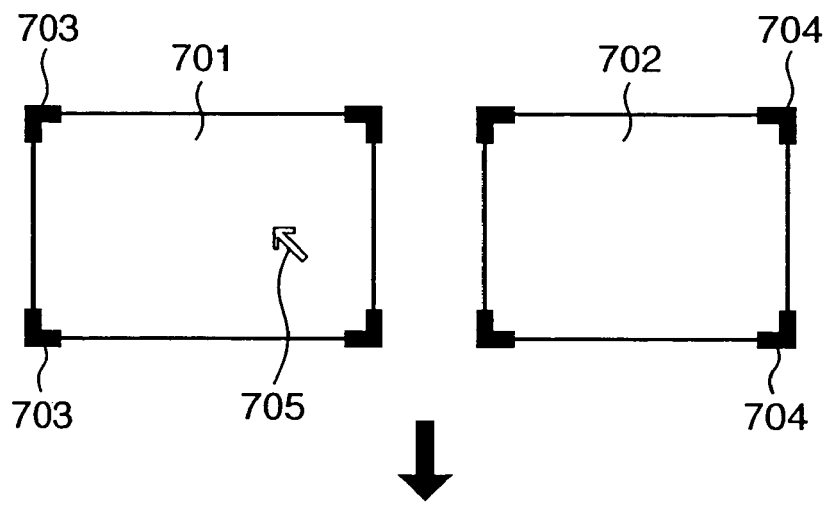
FIGS. 7A to 7C are views showing an example of transition of the user interface in creating a link.
Figure 7B:
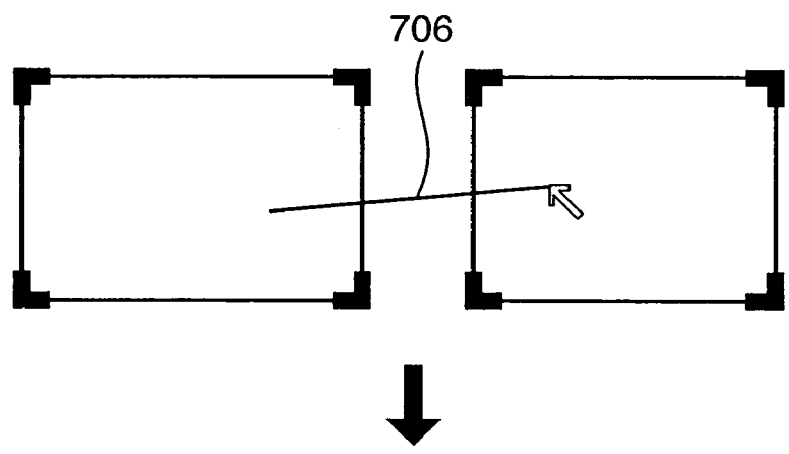
Figure 7C:
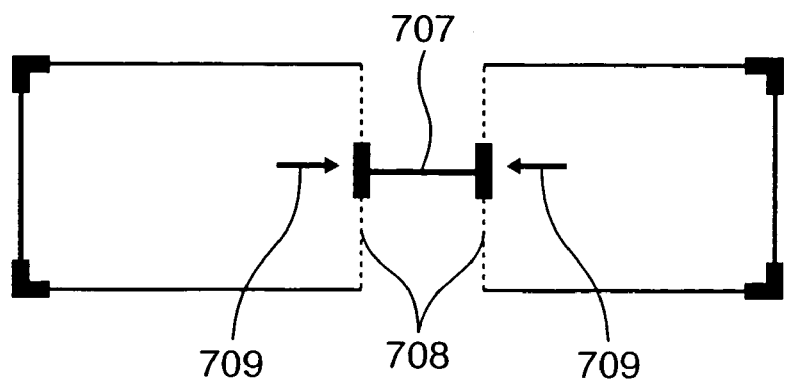

Setting of a link to associate containers with each other will be described next. FIG. 6 is a flowchart showing the link setting method. FIGS. 7A to 7C show an example of transition of the user interface (UI) in setting a link. A method of setting a link between containers will be described with reference to FIGS. 6 and 7A to 7C.

First, in step S601, the layout editing application 121 displays a document template selected for editing on the work area 306 of the user interface window. To set a link, containers (at least two containers) must be created on the document template. FIGS. 7A to 7C show an example of transition of the user interface when two containers are created in step S601, and a link is set.

In step S602, the layout editing application 121 determines whether the above-described link tool is set in a selected state (a selected state is set by clicking on the button 406 shown in FIG. 4). If NO in step S602, another processing is executed as needed (step S609), and the flow returns to step S602.

Referring to FIG. 7A, containers 701 and 702 have only fixed edges. Reference numerals 703 and 704 denote anchors, like the anchor 409 in FIG. 4; and 705, a mouse pointer. When the link tool is in the selected state, the user clicks on one (container 701) of the two containers, for which a link is to be set, to select the container. In accordance with this operation, the user interface 103 of the layout editing application 121 recognizes that the first container is designated (step S603) and holds information to specify the selected container. In addition, a locus corresponding to further movement of the mouse cursor is displayed on the screen (step S604). For example, a line segment 706 shown in FIG. 7B indicates a line which connects the click point in the state shown in FIG. 7A and the current position of the mouse cursor. With this UI, the position where a link is to be set can explicitly be presented to the user.

Next, as shown in FIG. 7B, the user moves the mouse pointer to the other container (container 702) and clicks on it. In accordance with this operation, the user interface 103 recognizes that the second container is designated (step S605). The layout editing application 121 sets a link between the first container held in step S604 and the second container recognized in step S605 as a designated container (step S606).

When the link is set between the two containers 701 and 702 selected by the user, a link UI 707 is displayed (step S607). In addition, when the link is set, the display state of the containers changes to that shown in FIG. 7C (step S608). That is, when the link is set, the UI of the containers is automatically changed. In this case, the edges associated with each other by the link change to flexible edges and are indicated by dotted lines. Referring to FIG. 7C, edges 708 are indicated by dotted lines. That is, the edges 708 are flexible edges, as described above.

The state of the edges of the containers is automatically changed, as shown in FIG. 7C, because the containers must have flexible edges due to link setting. This aims at preventing any contradiction which may occur when all edges are fixed even after link setting. Marks 709 visually show the user the directions in which the containers can change due to link setting, like the icons 505 shown in FIGS. 5A to 5D. In the example shown in FIG. 7C, the right edge of the left container and the left edge of the right container change to flexible edges. This is merely an example. For example, the right container may change to a setting with the sliders 413 in FIG. 4.

<Layout Calculation Processing by Layout Engine>

[Layout Calculation Method (Overall Flow)]

The layout editing application of this embodiment has a layout mode in which containers are created by using the user interface 103, and a layout is created by associating the containers with each other (link setting), and a preview mode in which each record of a data source is inserted in the created layout by the layout engine 105, and the layout result after actual record insertion is previewed. In the preview mode, actual records are inserted, and a layout is calculated in accordance with the above-described priority order. In the preview mode, however, the layout for display is calculated. Even in actual printing, the layout is calculated by causing the layout engine 105 to insert data in each container. The calculation method at this time is the same as in the preview mode.

Figure 8:
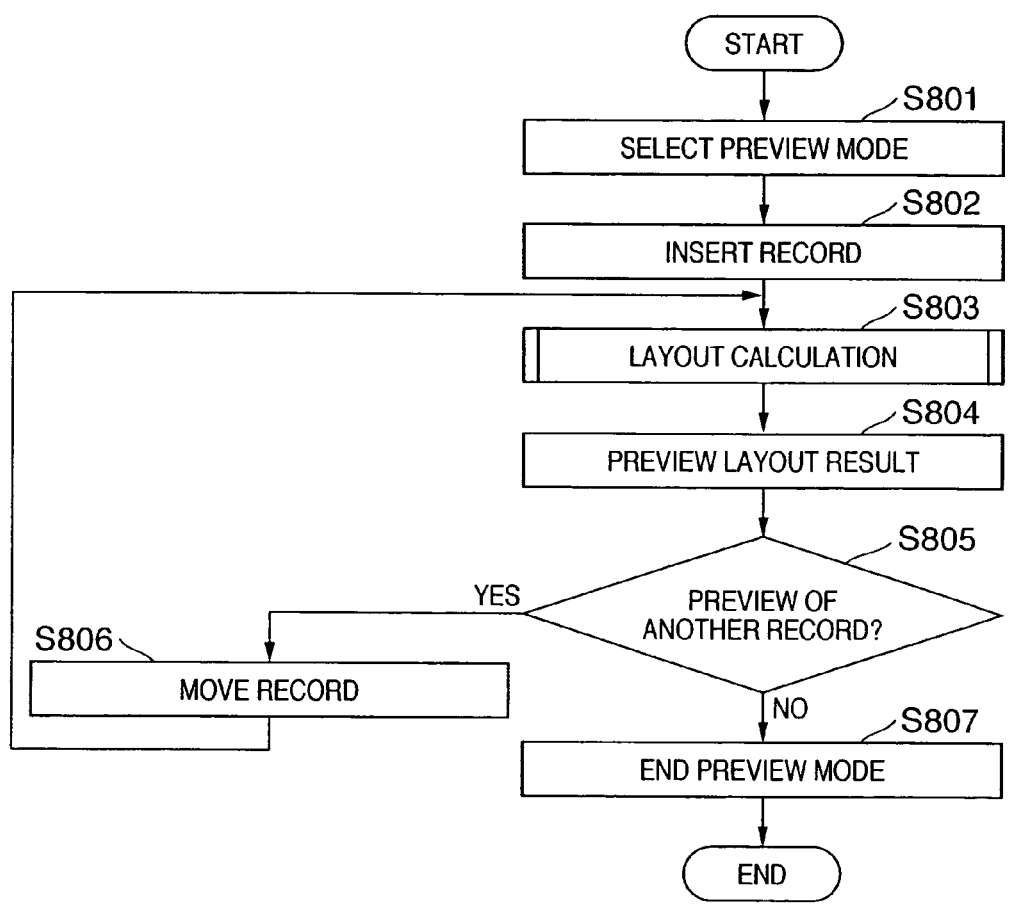
FIG. 8 is a flowchart showing layout calculation processing by a layout engine according to the embodiment.

FIG. 8 shows the flow of layout calculation. First, the preview mode is selected (step S801). In the preview mode, the layout editing application 121 causes the user to select a record to be previewed from the data source and determines to insert each field data of the selected record in each container (step S802). When insertion of the field data in each container is determined, the layout editing application 121 executes calculation to lay out the record and executes layout adjustment as needed (step S803). The layout calculation in step S803 will be described later in detail. The layout editing application 121 displays the layout calculated in step S803 (step S804). The layout editing application 121 determines in accordance with a user instruction whether to preview another record (step S805). If NO in step S805, the preview mode is ended (step S807). If YES in step S805, the layout editing application 121 selects another record, executes layout calculation again, and previews the layout (step S806).

When the print mode is set rather than the preview mode, layout calculation is done sequentially for all records to be printed. Hence, step S804 is omitted. In step S805, it is determined whether all records to be printed are processed. The layout calculation result in step S803 is output, and print data is generated by using the printer driver and output to the printer. In this case, when print data output is ended for all records (all records designated for printing), the processing is ended.

[Layout Calculation Method (Details)]

Figure 9:
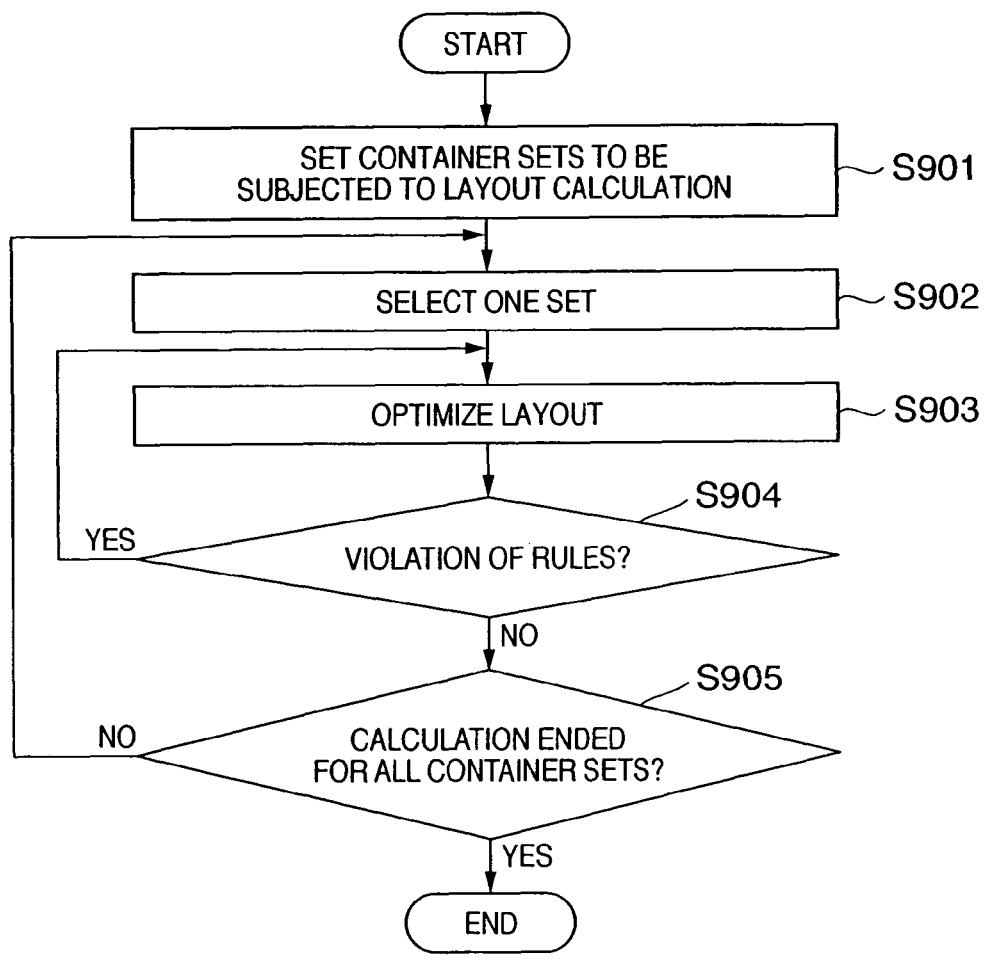
FIG. 9 is a flowchart showing layout calculation processing by the layout engine according to the embodiment.
Figure 10A:
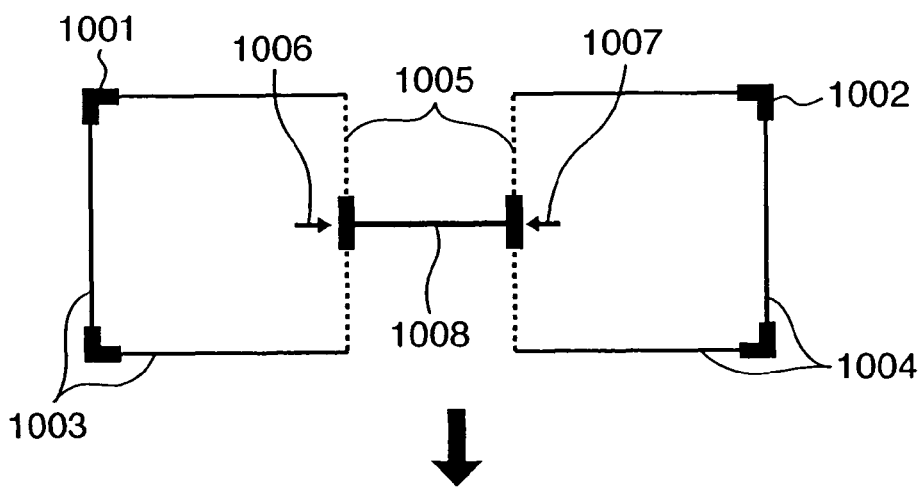
FIGS. 10A to 10C are views for explaining layout calculation processing according to the embodiment.
Figure 10B:
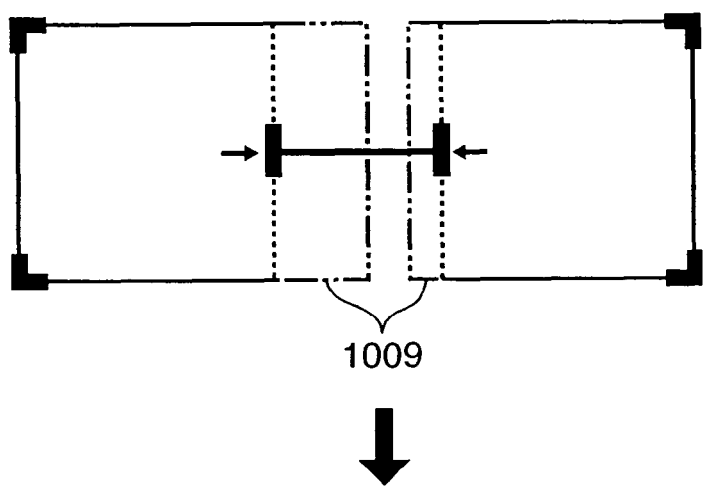
Figure 10C:
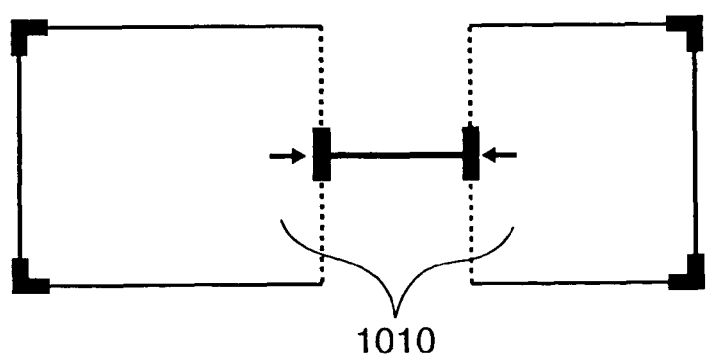

The layout calculation in step S803 will be described next in detail. FIG. 9 is a flowchart showing a layout calculation method when the layout priority order of this embodiment is not set. FIGS. 10A to 10C are views showing an example of the UI display at this time. FIG. 9 is a flowchart for explaining only the layout calculation processing method. This corresponds to the layout calculation method in printing/previewing one record of variable data print. When a plurality of records are present, the following processing is repeated. These processing operations are implemented under the control of the processor 135 in the host computer 101.

Figure 11:
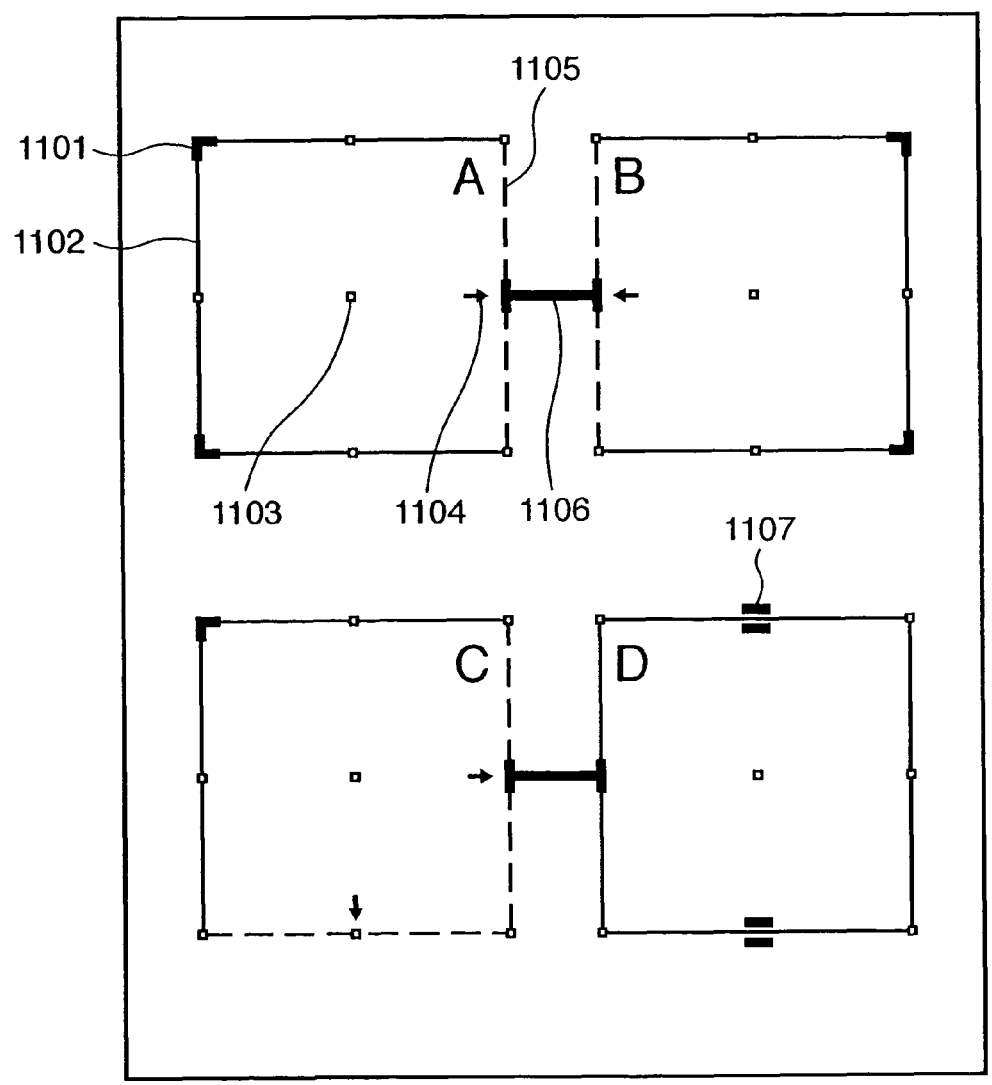
FIG. 11 is a view for explaining a set of containers in layout calculation according to the embodiment.

First, the layout editing application 121 obtains a set of containers whose layout should be calculated (step S901). Layout calculation is executed for a set of associated containers. Referring to, e.g., FIG. 11, four containers are laid out on a page and associated with each other. In this case, containers A and B are associated by a link, and containers C and D are also associated by a link. Hence, the containers A and B form set 1, and containers C and D form set 2. That is, a group of containers connected by a link is specified as a set. As described above, reference numeral 1101 denotes an anchor; 1102, a fixed edge; 1103, a controller; 1104, an arrow which indicates the change direction of a flexible edge; 1105, a flexible edge; 1106, a link; and 1107, a slider.

The layout editing application 121 selects a set as a layout calculation target from the container sets obtained in step S901 (step S902). For the selected container set, layout calculation is executed. First, the sizes of the two containers (A and B) as flexible elements included in the selected container set are calculated assuming that the containers are not affected by the image size or text amount of contents data to be inserted.

More specifically, the layout editing application 121 determines whether the container A is an image data container or text container. This determination can be done on the basis of the attribute set for the container, as described above. Next, the layout editing application 121 reads out the data to be inserted in the container A. When the container A is an image data container, the size (the number of horizontal pixels, the number of vertical pixels, and the resolution) of the image data is defined as the size of the container A without any constraint. When the container A is a text container, the amount of data to be inserted in the container A can be calculated on the basis of the number of characters of text data and the character attribute such as a font type, font size, character pitch, and line pitch designated by the container attribute of the container A. The layout editing application 121 can recognize the contents data in the database and the attributes of associated containers. When the contents data size is calculated by the above-described calculation, it can be determined whether the size is different from the standard size of the container. If the contents data size is different from the standard size of the container, the ordering between them can also be determined.

For the text container, a constraint is applied because the aspect ratio of the container A cannot be determined without considering a constraint. In the example shown in FIG. 11, since anchors are set at the upper left and lower left corners of the container A, the height (vertical direction) is fixed. Hence, the layout editing application 121 determines whether characters corresponding to the calculated data amount (text amount) can be inserted in the container A having the width (horizontal direction) set as the basic pattern of the container A. If it is determined that all characters can be inserted, the standard size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual contents size becomes as small as possible (step S903). The layout is optimized such that the difference between the size of the content to be inserted and the size of layout becomes as equal as possible between the containers associated with each other to dynamically change their sizes. The layout editing application 121 obtains the size of the container set selected in step S902, i.e., the total size of the container A, container B, and link 1106 (a fixed link in this case). Then, the layout editing application 121 calculates the difference between the total size and the size of the container set in the basic layout (in the example shown in FIG. 11, the size of the container set corresponds to the distance between the anchor icons of the containers A and B). If the width of the container A or B is increased by the calculation in the preceding step, a difference value is generated. The layout editing application 121 equally distributes the difference value to the elements of the container set, thereby adjusting the layout.

The layout editing application 121 optimizes the layout. If a violation of rules has occurred, calculation is executed again to prevent any violation of rules (step S904). The rules described here are constraints set by the user in creating the layout. Examples of the constraints are a constraint on the container size change range or container position, and for a flexible link, a constraint on the change in link length. When the layout is calculated without any violation of rules, the layout of the set is completed. The processing in steps S902 to S904 is executed for all sets on the page. With the processing, the layout editing application 121 calculates the layout of the entire page (step S905).

FIGS. 10A to 10C show a UI example in laying out containers without setting the priority order.

FIG. 10A shows a state in which records are inserted, and the layout is determined. Reference numerals 1001 and 1002 denote anchors; 1003 and 1004, fixed edges; 1005, a flexible edge; 1006, an arrow which indicates the change direction of a flexible edge; and 1008, a link. In this state, the records are changed, and contents having different sizes are inserted. Referring to FIG. 10B, the sizes of the new contents are superimposed on the state shown in FIG. 10A. Reference numeral 1009 denotes a size of the content to be inserted in each container. Layout calculation is executed. FIG. 10C shows the result of layout calculation. The sizes of the containers are calculated such that they have the same difference to the size of the content to be actually inserted, and no violation of the above-described rules occurs. As shown in FIG. 10C, the contents size (1009) to be inserted shown in FIG. 10B and a contents size (1010) after calculation have the same difference to the reference container size.

[Setting of Link with Flexible Length]

Figure 12:
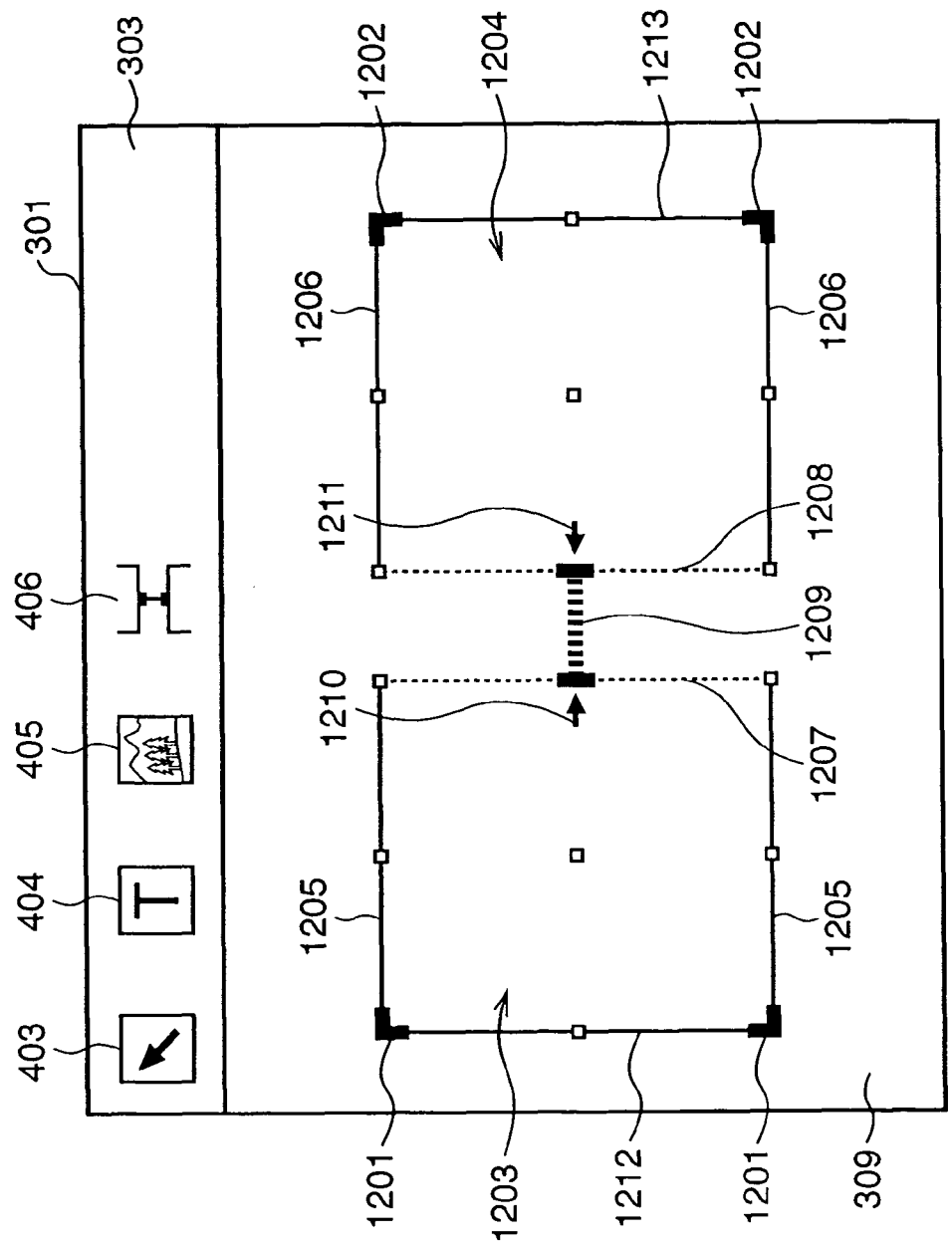
FIG. 12 is a view showing a display example in the user interface when containers are laid out by a flexible link.

FIG. 12 shows a user interface to set a flexible link. As in FIG. 4, the user interface has the application window 301 and tool bar 303. In the state shown in FIG. 12, containers 1203 and 1204 are present on the document template 309. The containers include anchor icons 1201 and 1202 and fixed edges 1205 and 1206. A link 1209 having a flexible size is set between the containers 1203 and 1204 to connect them. Since the link is set between the containers 1203 and 1204, a right edge 1207 of the container 1203 and a left edge 1208 of the container 1204 are expressed by dotted lines. Hence, indicators 1210 and 1211 are displayed in the containers to indicate that the edges 1207 and 1208 are flexible.

Figure 14:
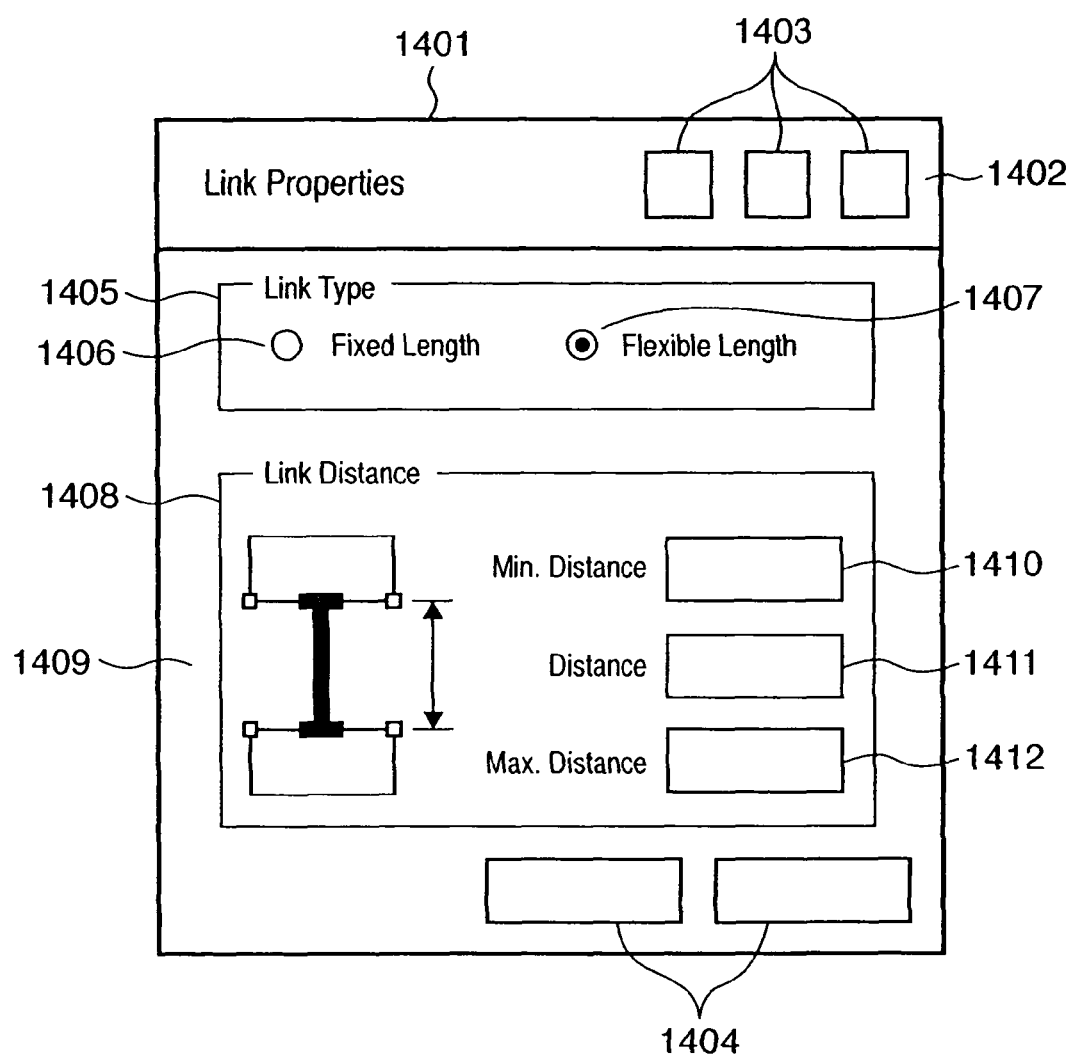
FIG. 14 is a view showing a link setting dialogue window according to the embodiment.

FIG. 14 shows a user interface window in the link setting means. FIG. 14 shows an example of a dialogue window 1401 to set the information of the link 1209. This dialogue includes a title bar 1402, a tool button 1403, a button 1404 to open/close the dialogue window, and an area 1409 to set various kinds of information. In this dialogue window, the link type can alternatively be selected from a flexible length (1407) and a fixed length (1406). When the link type is "flexible", the minimum value (Min. Distance 1410), maximum value (Max. Distance 1412), and reference value (Distance 1411) of the link length can be set. The dialogue 1401 shown in FIG. 14 is displayed when a link is set between two containers by the link setting operation described with reference to FIGS. 6 and 7A to 7C, and the set link is selected by, e.g., a click operation. Alternatively, immediately after a link is set, the dialogue window 1401 related to the link may be displayed automatically. The reference value 1411 of the distance between the containers indicates a link length used when the size of each container does not change at the time of data insertion.

Figure 13:
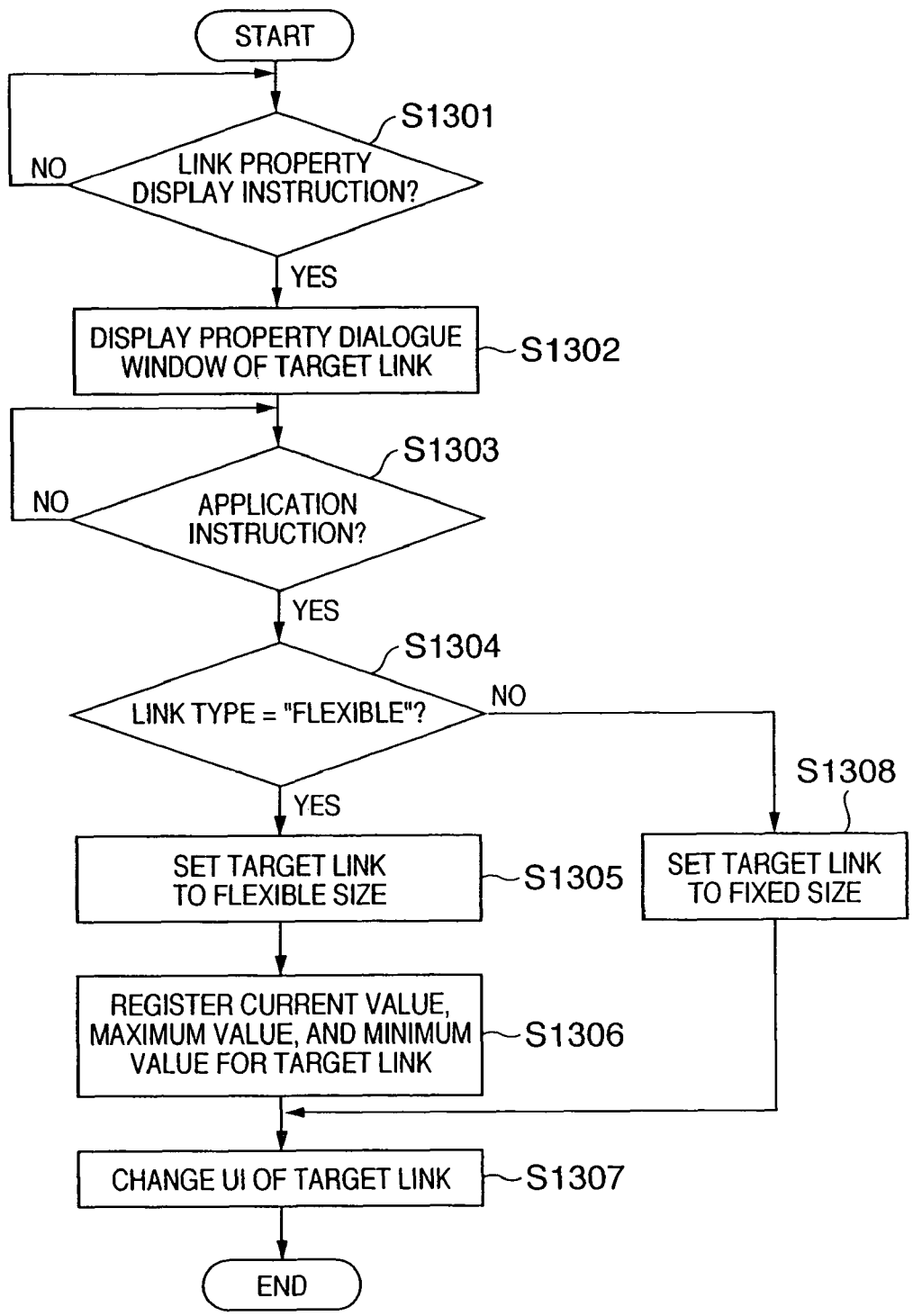
FIG. 13 is a flowchart for explaining processing of setting a flexible link by the user interface according to the embodiment.

FIG. 13 is a flowchart for explaining flexible link setting procedures by the user interface 103 according to this embodiment. For example, when a link is set between, e.g., the containers A and B shown in FIG. 11 in accordance with the procedures described with reference to FIGS. 6 and 7A to 7C, a link with a fixed size is set first. When this link is selected, and processing shown in FIG. 13 is executed, the link can be changed from a link 1106 (FIG. 11) with a fixed size to a link 1209 (FIG. 12) with a flexible size. These processing operations are implemented under the control of the processor 135 in the host computer 101.

First, a desired link (e.g., link 1106) is selected by the mouse, and a predetermined operation to display link properties is performed. The user interface 103 of the layout editing application 121 recognizes the operation as input of a link property display instruction (step S1301). Upon recognizing the link property display instruction, the property dialogue window 1401 (FIG. 14) corresponding to the selected link (to be referred to as a target link hereinafter) is displayed. Next, the user interface 103 displays link properties (step S1302). A link can be selected by any operation such as clicking on the right button of the mouse or operating a specific key of the keyboard, like in setting the basic pattern of a container.

The current state of the selected link is shown in the dialogue window 1401 displayed in step S1302. In this example, since the link 1106 is selected, the link size is fixed at this step. As a Link Type 1405, the Fixed Length 1406 indicating a fixed length is selected.

In the dialogue window 1401, the Flexible Length 1407 is selected as the Link Type 1405 to change the link from the fixed size to the flexible size. Accordingly, the Max. Distance 1412, Min. Distance 1410, and Distance 1411 arranged in a Link Distance 1408 are validated, and numerical values can be set. To set the flexible size of the link, the user sets the maximum value of the link length in the Max. Distance 1412, the minimum value in the Min. Distance 1410, and the current value in the Distance 1411.

When setting is ended, the user instructs application of the setting by clicking on the general dialogue window open/close button 1404. When the user interface 103 detects this instruction, the processing advances from step S1303 to step S1304 to reflect the set state on the target link.

In step S1304, the layout editing application 121 determines whether the target link has a fixed size or flexible size. When a fixed size is designated, the flow advances to step S1308 to set the target link to "fixed size". In step S1307, the display state of the target link is changed to "solid line" representing "fixed link".

If it is determined in step S1304 that a flexible size is designated, the flow advances to step S1305. The layout editing application 121 sets the target link to "flexible size". In step S1306, the current value (reference value), maximum value, and minimum value of the target link set in the dialogue window 1401 are registered. In step S1307, the display state of the target link is changed to "dotted line" representing "flexible link". As a result; the UI display of the link changes to the state indicated by the link 1209 in FIG. 12 (step S1306). The pieces of setting information of the dialogue window 1401 are stored in the memory.

As the current value set in the Distance 1411, the distance between the containers currently laid out may be input automatically as a default value.

Figure 15:
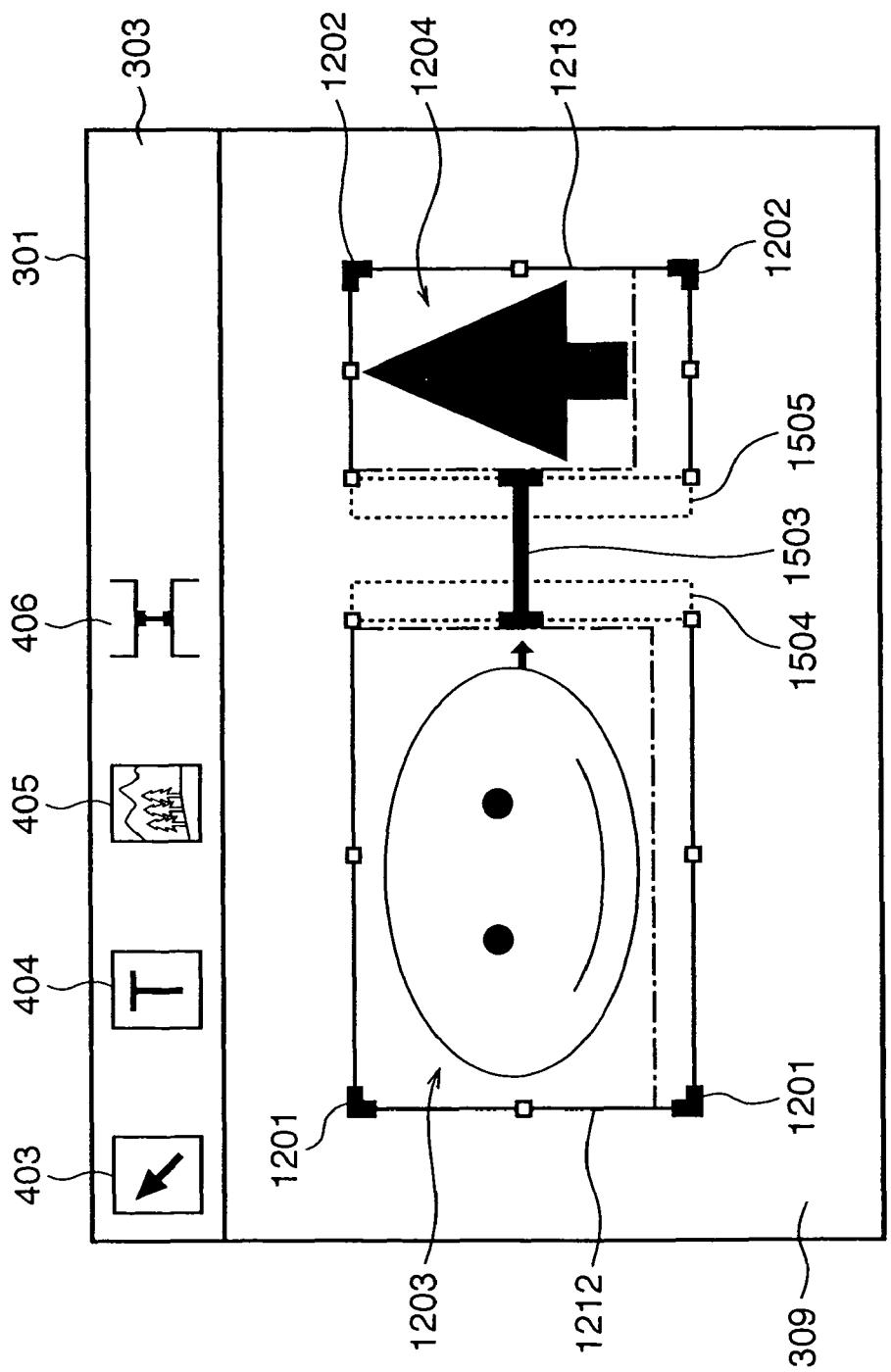
FIG. 15 is a view showing an example of a layout result by a fixed link.

FIG. 15 shows a layout result when a link with a fixed size is used. Layout calculation is executed in the above-described way. For example, assume that image data having different sizes are inserted in the containers 1203 and 1204 shown in FIG. 12. In this case, each container regards the data size as optimum. The container 1203 changes its size rightward to a frame 1504 (optimum container size) corresponding to the size of the inserted image. Similarly, the container 1204 changes its size leftward to a frame 1505 (optimum container size) corresponding to the size of the inserted image. However, the left edge 1212 of the container 1203 and the right edge 1213 of the container 1204 cannot be moved because of the anchors 1201 and 1202. To change the sizes of the containers, the distance between them must be shortened. However, a link 1503 having a fixed size is set between the containers. Since the link length is maintained in the layout calculation, the sizes of the containers 1203 and 1204 are changed.

As a consequence, the containers 1203 and 1204 cannot ensure the optimum sizes corresponding to the aspect ratios of the data. Finally, as shown in FIG. 15, the container sizes are smaller than the optimum sizes (frames 1504 and 1505). That is, since the size of the link 1503 is fixed, the containers 1203 and 1204 cannot achieve the optimum sizes (referring to FIG. 15, the range indicated by the alternate long and short dashed line in each container represents the aspect ratio of the data).

Figure 16:
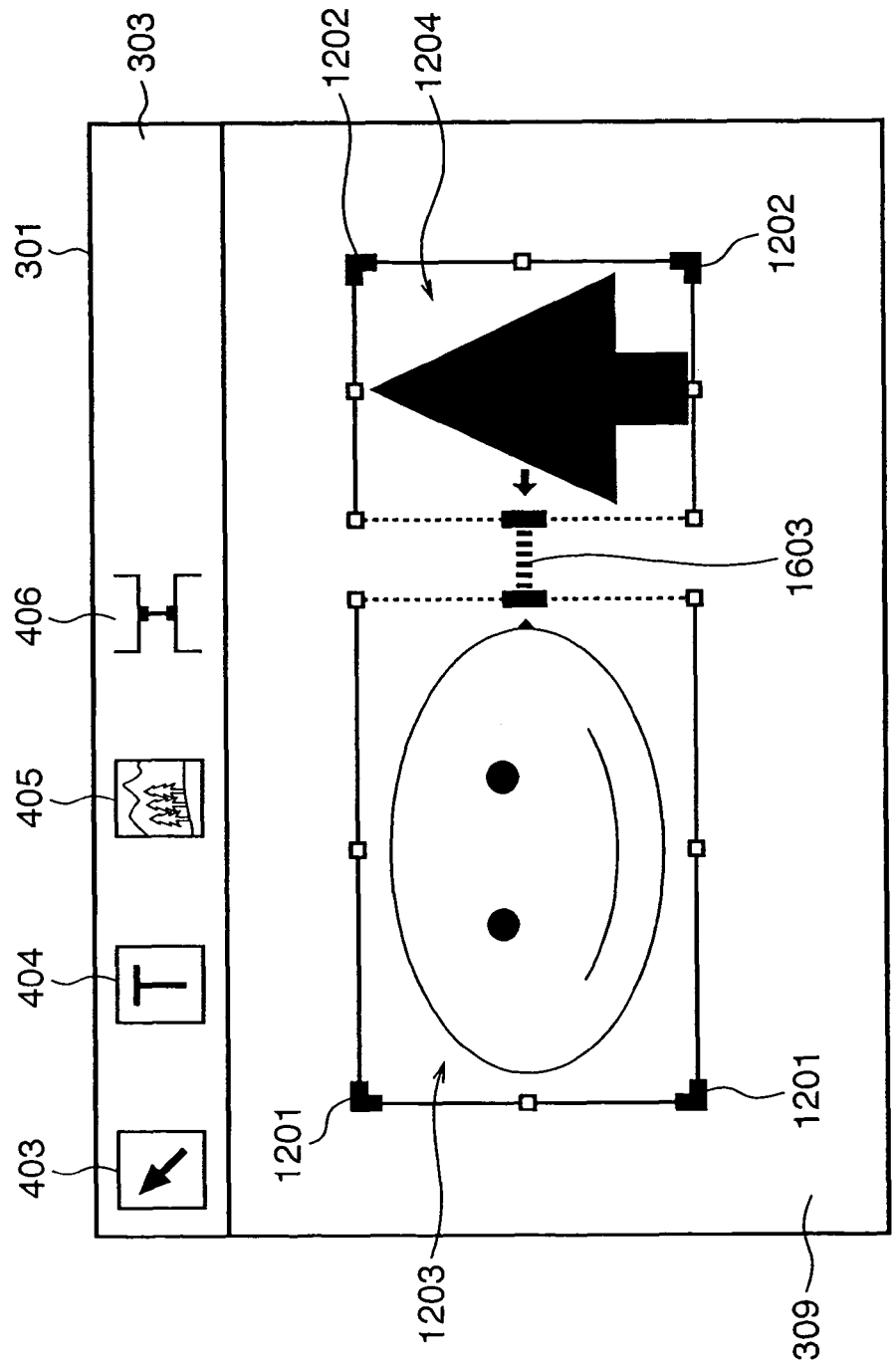
FIG. 16 is a view showing an example of a layout result by a flexible link.

FIG. 16 shows the same case as in FIG. 15 except that the link has a flexible size. In this case, a link having a flexible size is set between the containers 1203 and 1204 of the above example, as shown in FIG. 16. Hence, when the sizes of the containers 1203 and 1204 are changed, the link size decreases so that the containers 1203 and 1204 can be larger than in the example shown in FIG. 15. As a result, optimum sizes corresponding to the inserted data sizes can be achieved. Alternatively, container frames close to the inserted data sizes (optimum sizes) can be set. FIG. 16 shows this result. The size of the flexible link 1209 changes to a size indicated by a flexible link 1603 as a result of layout calculation. In this case, the containers 1203 and 1204 have optimum sizes (sizes corresponding to the data sizes).

[Layout Method with Basic Size Priority]

FIGS. 17A to 17F are views for explaining a layout method with basic size priority according to this embodiment. A basic size indicates a standard size set in creating a container (in designing a layout).

Figure 17A:
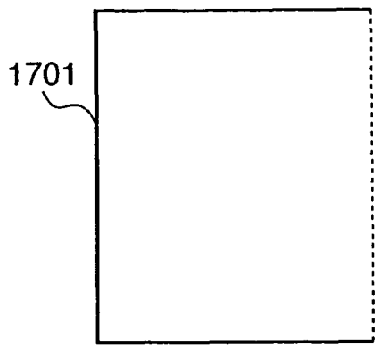
FIGS. 17A to 17F are views for explaining a layout method with basic size priority according to the embodiment.

FIG. 17A shows a state wherein no content is inserted in a container. At this time, a container 1701 has a size in designing a layout, i.e., the basic size. The rectangle 1701 represents a container. The upper, left, and low edges are fixed, and the right edge is flexible. To discriminate the states of the edges on the display, the upper, left, and low edges are indicated by solid lines, and the right edge is indicated by a dotted line.

Figure 17B:
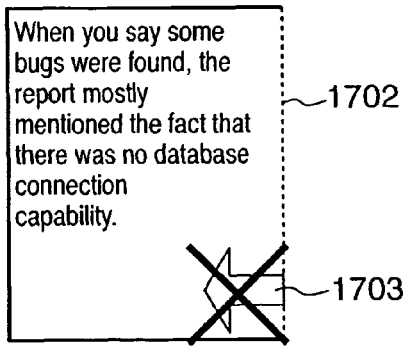

FIG. 17B shows a state wherein a text content is inserted in the container 1701 to form a container 1702. As indicated by the container 1702, the text as a content flows from the upper left to the lower right of the container. In this case, the size of the content inserted in the container 1702 is smaller than the size of the container 1702. In the layout method with basic size priority according to this embodiment, in such a case, the container size is not changed because the priority is given to the basic size. Referring to FIG. 17B, reference numeral 1703 indicates that the right edge of the container 1702 does not move in accordance with the contents size.

Figure 17C:
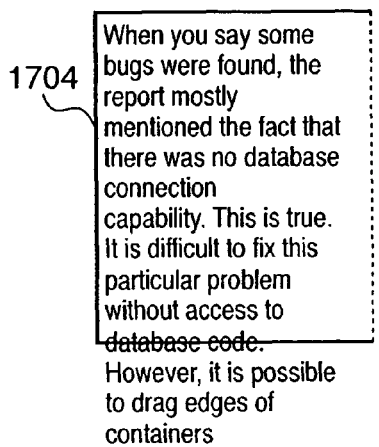

FIG. 17C shows another example wherein a text content different from that in FIG. 17B is inserted in the container 1701. The inserted text flows from the upper left to the lower right of the container. In this case, the size of the content inserted in a container 1704 is larger than the size of the container 1704. Hence, in FIG. 17C, the text is pushed off the container 1704 (overflow). In such a case, it is desired to change the size of the container 1704 to display the entire content.

Figure 17D:
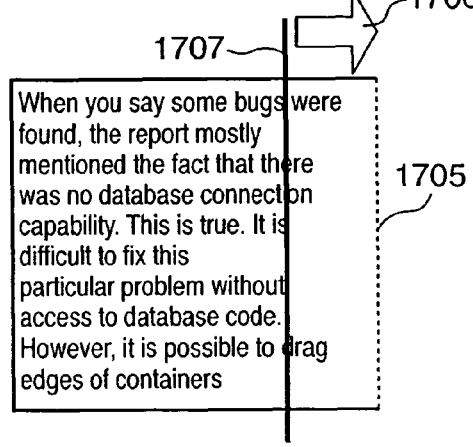

FIG. 17D shows a state wherein layout processing is executed in the state in FIG. 17C. A container 1705 indicates a state after the size of the container 1704 shown in FIG. 17C is changed. Since the right edge of the container 1705 is flexible, the container can increase its size to the right. An arrow 1706 indicates a state wherein the container 1705 is going to become large to the right. As a result of processing to display the entire content inserted in the container, the container 1704 finally obtains the size of the container 1705 so that the content inserted in the container 1705 can entirely be displayed. Reference numeral 1707 denotes an original position of the right edge of the container 1705 (the position in the basic size). This position is the same as that of the right edge of the container 1704 in FIG. 17C. Since the right edge of the container 1705 after layout calculation is located on the right edge of the position 1707, it can be recognized that the container size has increased.

Figure 17E:
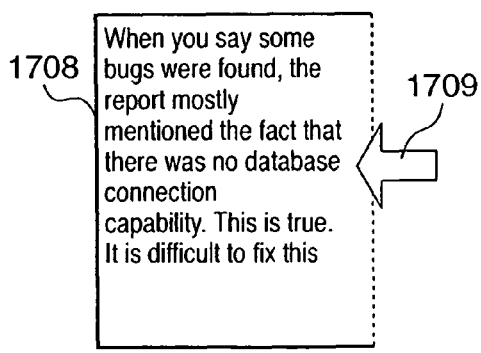

FIG. 17E shows another example wherein a text content is inserted in a container. In this example, an external element has a certain influence in addition to the insertion of the content. A typical example of the external element is a container. FIG. 17E shows a state wherein a container 1708 is influenced by an influence 1709 of an external element. A text content is inserted in the container 1708. The text flows from the upper left to the lower right of the container. In this case, the size of the content inserted in the container 1708 is smaller than the size of the container 1708. Hence, as described with reference to FIG. 17B, the size of the container 1708 does not change in accordance with the contents size. In this case, however, since an external element has the influence 1709 on the right edge of the container, it is desired to adjust the layout by changing the container size.

Figure 17F:
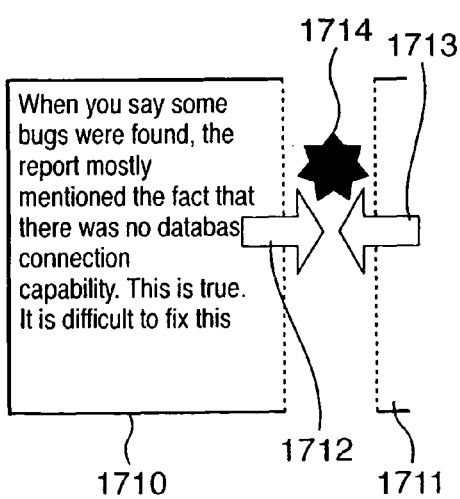

FIG. 17F shows a state immediately before layout processing is executed in the state in FIG. 17E. An operation executed when an external element 1711 pushes a container 1710 will be described. Before layout processing, the size of the container 1710 equals that of the container 1708 in FIG. 17E. When the external element 1711 pushes the container 1710, layout calculation is executed between the container 1710 and the external element 1711 without maintaining the size of the container 1710. An arrow 1713 indicates the direction in which the external element 1711 pushes the container 1710. An arrow 1712 indicates that layout calculation with respect to the external element 1711 is executed when the container 1710 is pushed by the external element 1711. Reference numeral 1714 denotes a collision state of the container 1710 and external element 1711 on the layout. A force from an external element indicated by the arrow 1709 in FIG. 17E will be referred to as a "pushing force" hereinafter.

As described above, in the layout method with basic size priority, layout processing is controlled in accordance with the following three rules.

1. When a content smaller than the container size is inserted, and no influence from an external element is present, the container size is not changed.

2. When a content larger than the container size is inserted, the container changes its size by itself.

3. When an influence from an external element is present independently of the contents size, layout calculation with respect to the external element is executed. The influence here indicates a pushing force from the external element, as described above, or a pulling force to be described later with reference to FIGS. 19A and 19B.

When the layout attribute with basic size priority can be set for each container, layout processing can be executed while reflecting the reference container size preset by the user.

[Layout Method with Contents Size Priority]

FIGS. 27A to 27F are views for explaining a layout method with contents size priority.

FIG. 27A shows an example wherein a text content is inserted in a container 2701. As for the state of the container, only the right edge of the container is flexible, as in FIG. 17A. The text content flows from the upper left to the lower right of the container 2701. In this case, the size of the content inserted in the container 2701 is smaller than the size of the container 2701. In the layout method with contents size priority, however, the container size is changed in accordance with the contents size because the priority is given to the contents size.

FIG. 27B shows a state wherein layout processing with contents size priority is executed in the state shown in FIG. 27A. A container 2702 indicates a size after the size of the container 2701 in FIG. 27A is changed. Since the right edge of the container 2702 is flexible, the container can decrease its size by moving the right edge. An arrow 2703 indicates a state wherein the container 2702 is going to become small to the left. As a result of processing to reduce the container size in accordance with the content inserted in the container 2702, the container 2701 finally obtains the size of the container 2702. As a result, a container size corresponding to the content inserted in the container 2702 can be obtained. Reference numeral 2704 denotes an original (basic) size position of the right edge of the container 2702. This position is the same as that of the right edge of the container 2701 in FIG. 27A. Since the right edge of the container 2702 after layout calculation is located on the left edge of the position 2704, it can be recognized that the container size has decreased.

FIG. 27C shows another example wherein a text content is inserted in a container 2705. A text content is inserted in the container 2705. The text flows from the upper left to the lower right of the container. In this case, the size of the content inserted in the container 2705 is larger than the size of the container 2705. Hence, in FIG. 27C, the text is pushed off the container 2705 (overflow). In such a case, it is desired to change the size of the container 2705 to display the entire content.

FIG. 27D shows a state wherein layout processing is executed in the state in FIG. 27C. A container 2706 indicates a size after the size of the container 2705 shown in FIG. 27C is changed. Since the right edge of the container 2706 is flexible, the container can increase its size to the right. An arrow 2707 indicates a state wherein the container 2706 is going to become large to the right. As a result of processing to display the entire content inserted in the container 2706, the container 2705 finally obtains the size of the container 2706 so that the content inserted in the container 2706 can entirely be displayed. Reference numeral 2708 denotes an original (basic) size position of the right edge of the container 2706. This position is the same as that of the right edge of the container 2705 in FIG. 27C. Since the right edge of the container 2706 after layout calculation is located on the right edge of the position 2708, it can be recognized that the container size has increased. The layout processing described with reference to FIGS. 27C and 27D yields the same result as that of the layout processing shown in FIGS. 17C and 17D.

FIG. 27E shows another example wherein a text content is inserted in a container 2709. In this example, an external element has a certain influence in addition to the insertion of the content. The container 2709 receives a pushing force 2710 as the influence of an external element. A text content is inserted in the container 2709. The text flows from the upper left to the lower right of the container. In this case, the size of the content inserted in the container 2709 equals the size of the container 2709. Hence, normally, the size of the container 2709 does not change because it already has the ideal size. In the case shown in FIG. 27E, however, since an external element has the influence (pushing force) 2710 on the right edge of the container, it is desired to adjust the layout by changing the container size.

FIG. 27F shows a state immediately before layout processing is executed in the state in FIG. 27E. An operation executed when an external element 2712 pushes a container 2711 will be described. Before layout processing, the size of the container 2711 equals that of the container 2709 in FIG. 27E. When the external element 2712 pushes the container 2711, layout calculation is executed between the container 2711 and the external element 2712 without maintaining the size of the container 2711. An arrow 2714 indicates the direction in which the external element 2712 pushes the container 2711. An arrow 2713 indicates that layout calculation with respect to the external element 2712 is executed when the container 2711 is pushed by the external element 2712. Reference numeral 2715 denotes a collision state of the container 2711 and external element 2712 on the layout.

As described above, in the layout method with contents size priority, layout processing is controlled in accordance with the following two rules.

1. A container will always change its size in accordance with the contents size independently of the container size.

2. If an influence from an external element is present, layout calculation with respect to the external element is executed even when the size of an inserted content equals the container size, and the container size need not be changed. The influence here also indicates a pushing force or pulling force, as described above.

When the layout attribute with contents size priority can be set for each container, the size of each container is changed in accordance with the size of the inserted content. Hence, a layout reflecting the actual size of each content can be created.

[Setting of Basic Size Priority and Contents Size Priority for Containers]

Whether to use the layout method with basic size priority or the layout method with contents size priority described above can be set for each container.

Figure 26:
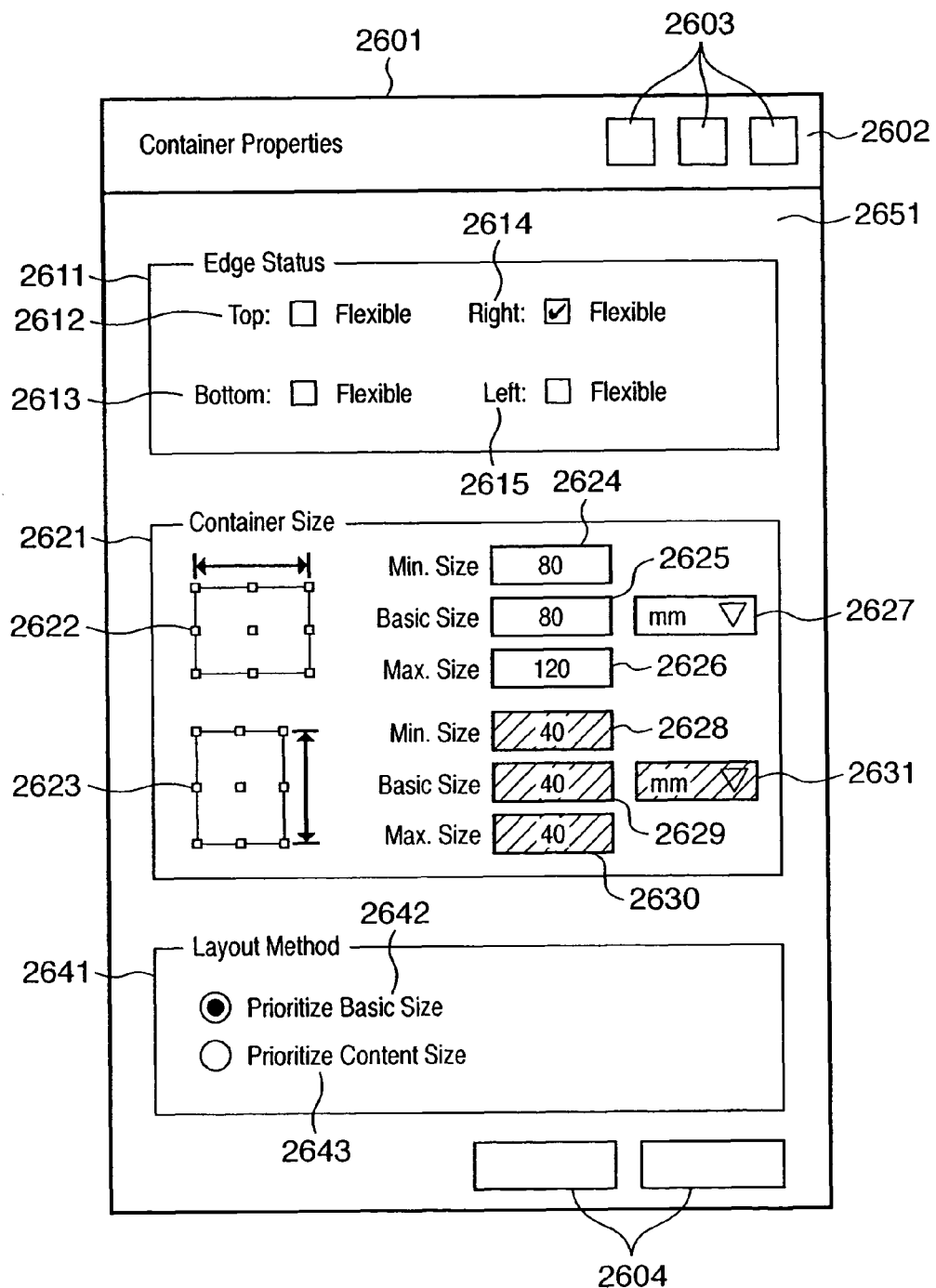
FIG. 26 is a view showing a display example of the UI property dialogue.

FIG. 26 is a view showing an example of a user interface (UI) dialogue to set the property of a container. The property dialogue window can be displayed by, e.g., selecting a container by using the keyboard 132 or mouse 133, selecting a menu item displayed by clicking on the right button of the mouse, or pressing, e.g., the Alt key of the keyboard. In this embodiment, whether to set a container edge flexible, the layout method to be applied, and settings related to it are displayed in the property dialogue window.

A property dialogue window 2601 includes a title bar 2602, tool buttons 2603, buttons 2604 to open/close the property dialogue window, and an area 2651 to set various kinds of information. The property dialogue window 2601 has Edge Status (2611) including select options 2612 to 2615 to set whether to make a container size flexible. When the select options are turned on, fields except Basic Size designation boxes (2625 and 2629) and unit system designation boxes (2627 and 2631) in Container Size (2621) are enabled. The Basic Size designation boxes (2625 and 2629) and unit system designation boxes (2627 and 2631) indicate the standard size of the container and are therefore enabled always. In this example, only the Right (right edge) 2614 in the Edge Status 2611 is checked to set "Flexible" so that this container can change its size only in the horizontal direction (actually to the right). Hence, in the Container Size 2621, items 2624 and 2626 of the width are enabled, and items 2628 and 2630 of the height remain disabled.

Graphics 2622 and 2623 are bitmap images to visually assist designations of the width and height of the container, respectively. In the box 2624 (Min. Size), the minimum value of the width of the container is set. Currently, a value of 80 is set in this box. In the box 2625 (Basic Size), the reference width of the container is displayed. In the box 2626 (Max. Size), the maximum value of the width of the container is set. Currently, a value of 120 is set in this box. Similarly, the minimum value of the height of the container can be set in the box 2628. The reference height of the container can be set in the box 2629. The maximum value of the height of the container can be set in the box 2630. In the list boxes 2627 and 2631, the unit of the container size is set. As an example of the unit, mm is displayed here. However, inch or pixel can also be used. The property dialogue window 2601 also has select buttons 2642 and 2643 to set whether to prioritize the basic size or contents size for layout calculation (Layout Method 2641). If the container size is not set flexible, the priority of the calculation method need not be set by using the two select buttons. Hence, the Layout Method 2641 is enabled when any one of the select options 2612 to 2615 in the above-described Edge Status 2611 is checked. In this example, since the select button 2642 (Prioritize Basic Size) is selected, layout calculation with basic size priority is executed for this container.

By using the Layout Method 2641, whether to execute layout calculation with basic size priority or contents size priority can be set for each container. With this arrangement, layout processing considering the user's desire can be executed by making use of a document template designed in advance or reflecting the size of an inserted content.

Figure 24:
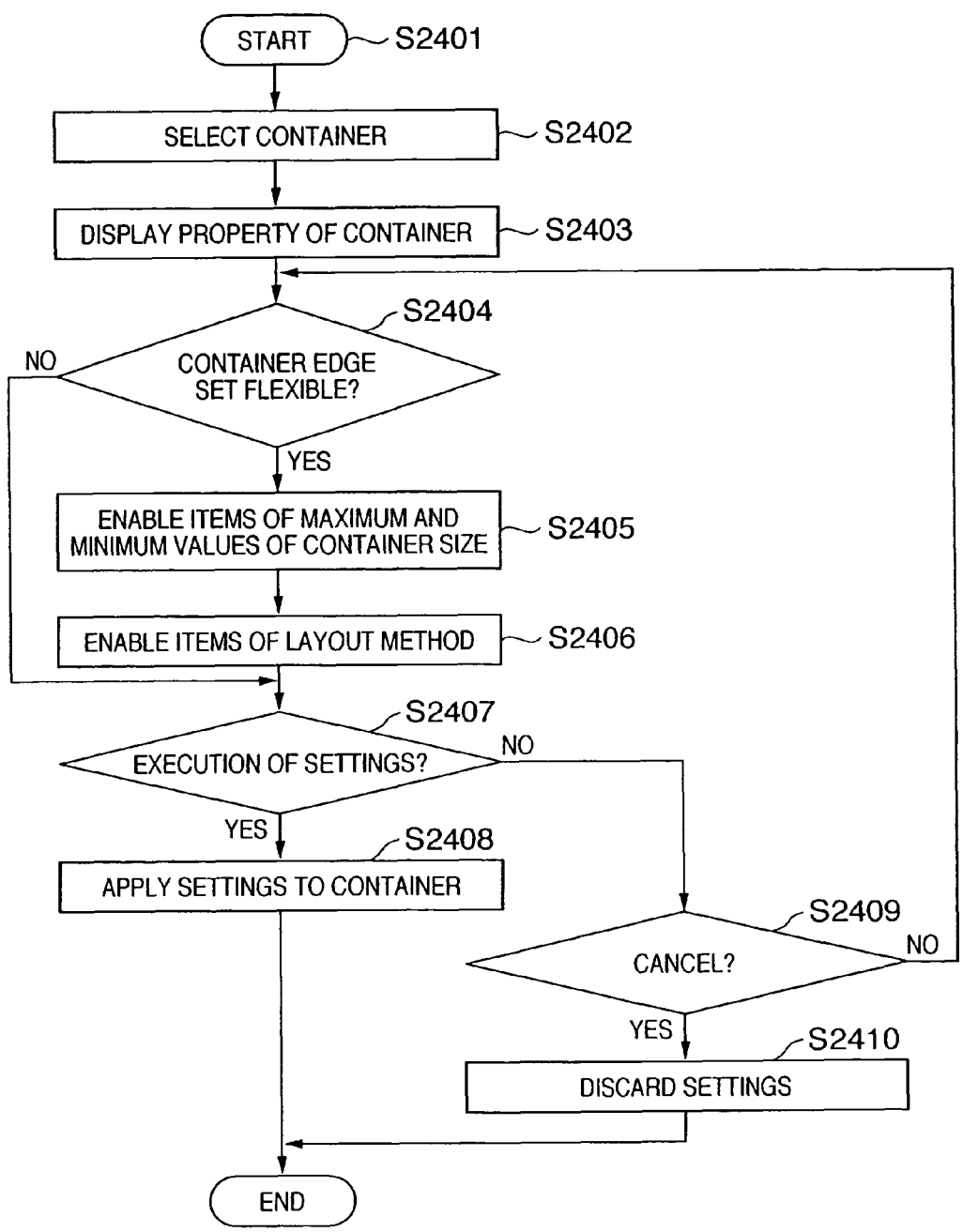
FIG. 24 is a flowchart showing setting processing by using a UI property dialogue.

FIG. 24 is a flowchart showing setting processing by using the UI property dialogue described with reference to FIG. 26. These processing operations are implemented under the control of the processor 135 in the host computer 101. When a container is selected on a layout editing window (not shown), and display of the UI property dialogue is instructed by, e.g., selecting a menu item displayed by clicking on the right button of the mouse, the UI property dialogue (FIG. 26) of the container is displayed (steps S2402 and S2403). In steps S2404 to S2406, the operation limit in the UI property dialogue is controlled. First, it is determined for the item of each edge in the Edge Status 2611 whether the container edge is set flexible (step S2404). If at least one edge is set flexible, the maximum and minimum value boxes (2624, 2626, 2628, and 2630) of the container size are enabled in accordance with the edge which is set flexible (step S2405). Simultaneously, the layout method select items are also enabled (step S2406).

When the OK button of the UI property dialogue is clicked on to instruct execution of the settings, the property dialogue is closed, and the set contents are applied to the corresponding container (steps S2407 and S2408). If the cancel button is clicked on to instruct cancel, the set contents are discarded, and the property dialogue is closed (steps S2409 and S2410).

[Processing for Container]

Figure 23A:
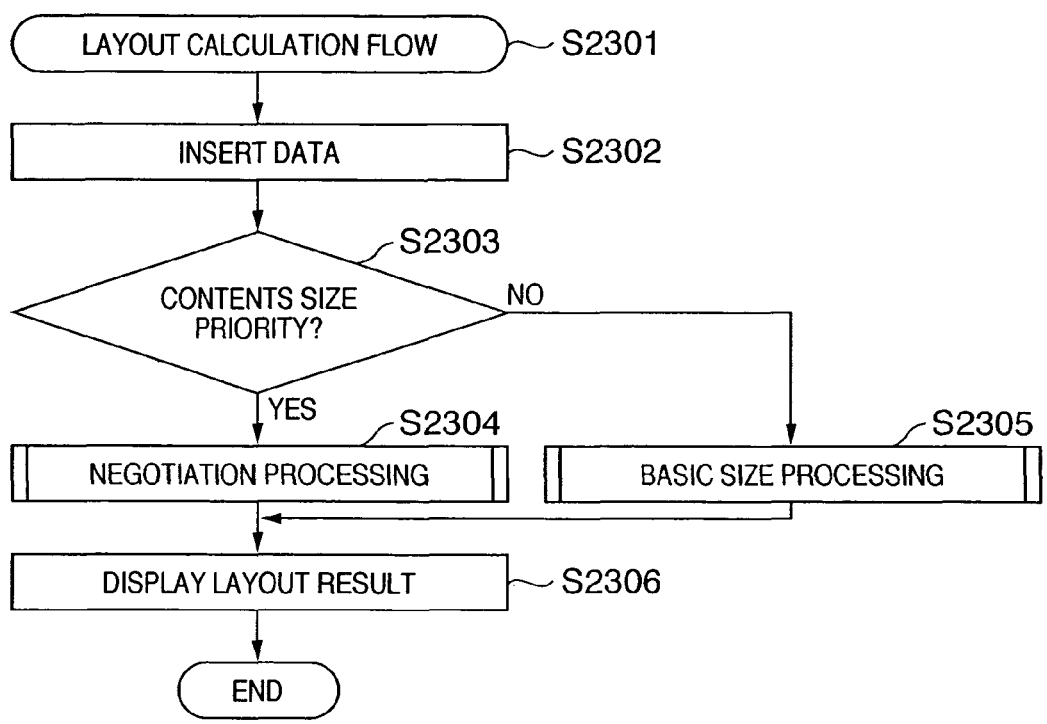
FIG. 23A is a flowchart for explaining procedures of processing one container by a set layout method.
Figure 23B:
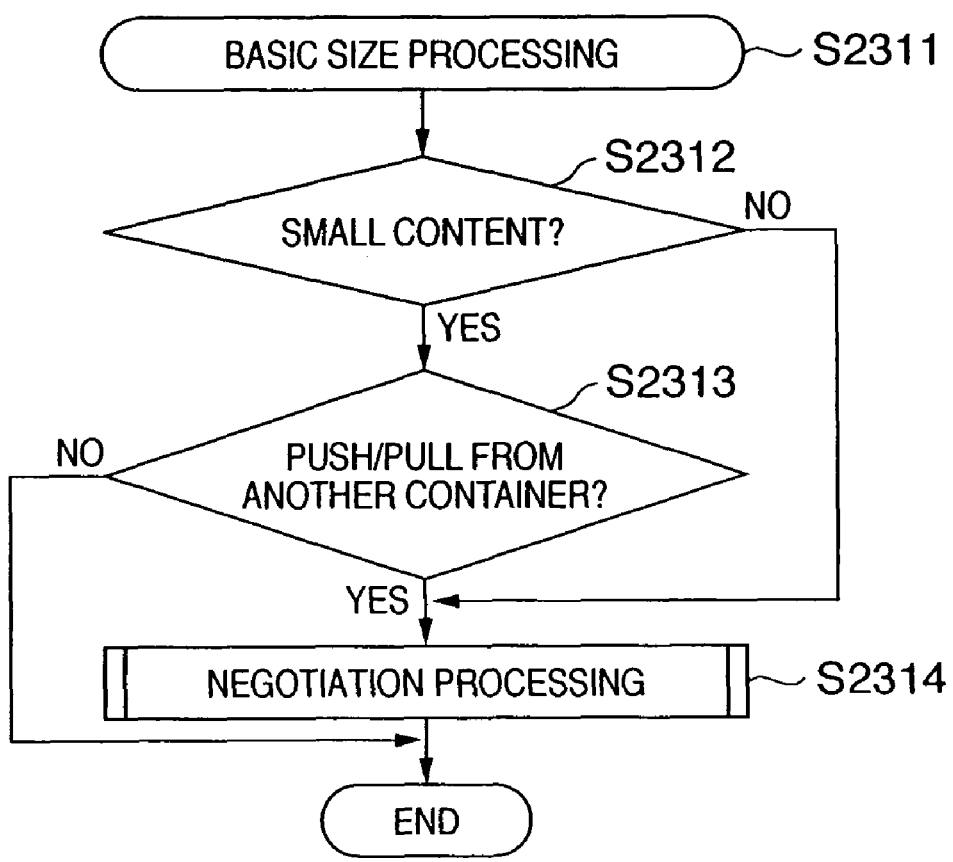
FIG. 23B is a flowchart showing basic size processing shown in FIG. 23A.

FIGS. 23A and 23B are flowcharts showing how a container of interest operates in accordance with a set layout method. These processing operations are implemented under the control of the processor 135 in the host computer 101.

Referring to FIG. 23A, data is inserted from, e.g., a database in a container (step S2302). It is determined whether the layout method set for the container has the basic size priority or contents size priority (step S2303). If the layout method with contents size priority is set, negotiation processing is executed (step S2304). The negotiation processing here indicates the layout calculation described above with reference to FIG. 8 or 9. The layout result is displayed (step S2306), and the processing is ended.

If it is determined in step S2303 that the layout method with basic size priority is set for the container, basic size processing is executed (step S2305), and the layout result is displayed (step S2306). In the basic size processing, layout calculation is performed in accordance with the processing shown in the flowchart of FIG. 23B.

In the basic size processing, it is determined whether the data (content) inserted in the container is equal to or smaller than the container size (step S2312). That is, it is checked whether display corresponding to the inserted is pushed off the container (overflow). If the display is not pushed off, it is determined that the "contents size is equal to or smaller than the container size". If the "contents size is equal to or smaller than the container size", it is determined whether an influence of pushing (pushing force) or pulling (pulling force) from another associated container is present (step S2313). If NO in step S2313, the processing in FIG. 23B is ended to display the layout result in step S2306 without executing any layout processing, i.e., without changing the container size.

If it is determined in step S2312 that the contents size is larger than the container size, negotiation processing is executed (step S2314), and the processing is ended. The negotiation result is displayed as the layout result (step S2306). If it is determined in step S2313 that the influence (pushing force or pulling force) from another container is present, negotiation processing is executed between the container and the associated container (step S2314), and the processing is ended. The negotiation result is displayed as the layout result (step S2306). The negotiation processing executed in step S2314 indicates the layout calculation described above with reference to FIG. 8 or 9.

[Example of Layout Processing when Container with Basic Size Priority and Container with Contents Size Priority are Associated]

FIGS. 18A and 18B, 19A and 19B, and 20A to 20C are views showing layout processing when a container to which the layout method with basic size priority is applied and a container to which the layout method with contents size priority is applied are associated.

Figure 18A:
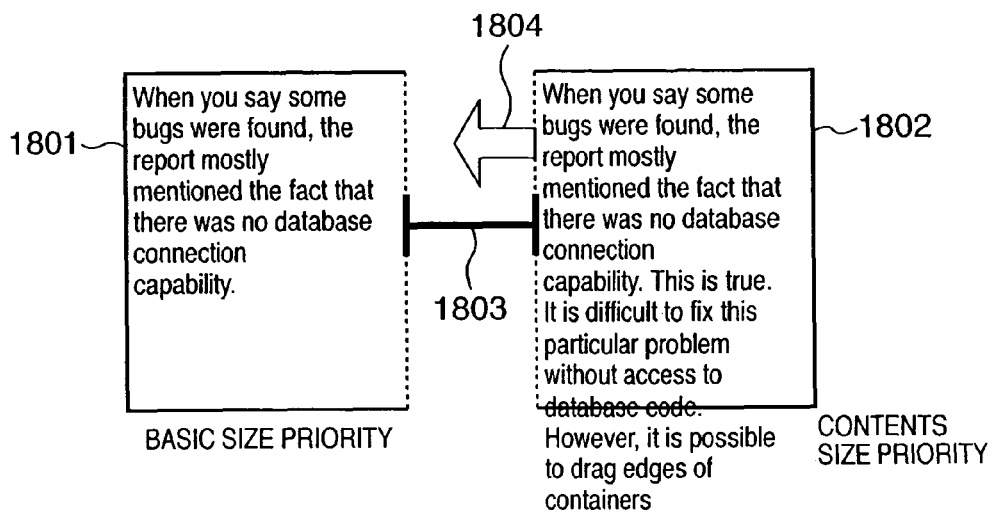
FIGS. 18A and 18B are views for explaining layout processing when a container with basic size priority and a container with contents size priority are associated.

FIG. 18A shows a state wherein containers 1801 and 1802 are arranged, and contents are inserted. The containers 1801 and 1802 are associated by a link 1803. The layout method with basic size priority is set for the container 1801, and the layout method with contents size priority is set for the container 1802. In the container 1801, the upper, left, and lower edges are fixed, and the right edge is flexible. In the container 1802, the upper, right, and lower edges are fixed, and the left edge is flexible. Text contents are inserted in the containers 1801 and 1802. The text flows from the upper left to the lower right of each container.

The size of the content inserted in the container 1801 is smaller than the size of the container 1801. In the layout method with basic size priority, the priority is given to the basic size (the standard size of the container: the size determined in creating the container). Hence, the container 1801 does not change its size in accordance with the contents size. On the other hand, the size of the content inserted in the container 1802 is larger than the size of the container 1802. In FIG. 18A, this state is indicated by the text pushed off the container 1802. In the layout method with contents size priority, the priority is given to the contents size (the size of data inserted from the database). Hence, the size of the container 1802 is changed in order to display the entire content.

Figure 18B:
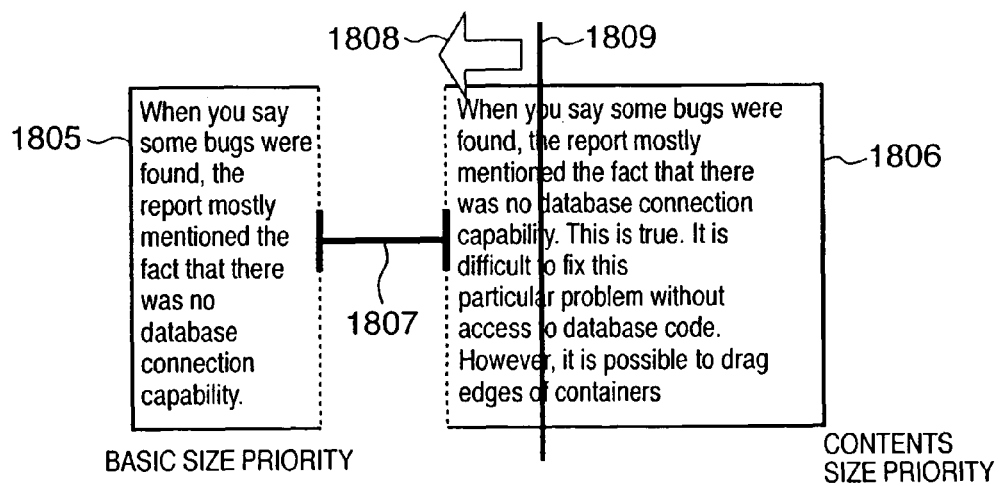

FIG. 18B shows a state wherein layout processing is executed in the state in FIG. 18A. A container 1805 is obtained by changing the size of the container 1801 in FIG. 18A by layout processing. A container 1806 is obtained by changing the size of the container 1802 in FIG. 18A by layout processing. Although the layout method with basic size priority is set for the container 1801, the container 1802 pushes the container 1801 in accordance with the contents size. Hence, the container 1801 receives an influence (pushing force) 1804 from the container 1802. Hence, negotiation processing is executed between the containers 1801 and 1802 to calculate the layout. Referring to FIG. 18B, the container 1801 reduces its size and changes to the container 1805, and the container 1802 increases its size and changes to the container 1806. Reference numeral 1809 denotes an original (basic) size position of the left edge of the container 1806.

This position is the same as that of the left edge of the container 1802 in FIG. 18A. Since the left edge of the container 1806 after layout calculation is located on the left edge of the position 1809, it can be recognized that the container size has increased. The size of the container 1805 reduces proportionally.

Figure 19A:
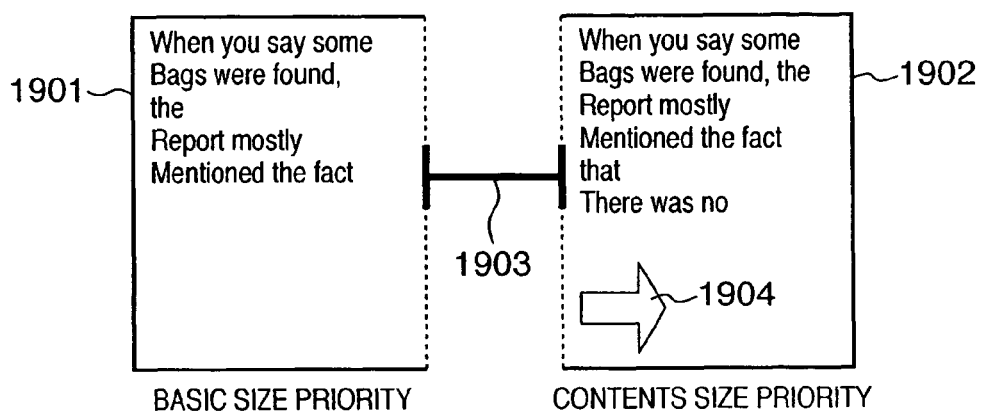
FIGS. 19A and 19B are views for explaining layout processing when a container with basic size priority and a container with contents size priority are associated.

FIG. 19A shows a state wherein containers 1901 and 1902 are arranged, and text contents are inserted. The containers 1901 and 1902 are associated by a link 1903. The layout method with basic size priority is set for the container 1901, and the layout method with contents size priority is set for the container 1902. In the container 1901, the upper, left, and lower edges are fixed, and the right edge is flexible. In the container 1902, the upper, right, and lower edges are fixed, and the left edge is flexible.

Text contents are inserted in the containers 1901 and 1902. The text flows from the upper left to the lower right of each container. The size of the text content inserted in the container 1901 is smaller than the size of the container 1901. As described above, the container 1901 for which the basic size priority is set does not change its size in accordance with the contents size. On the other hand, the size of the text content inserted in the container 1902 is also smaller than the size of the container 1902. In the layout method with contents size priority, processing of changing the size of the container 1902 in accordance with the contents size is executed. Hence, a pulling force indicated by an arrow 1904 is generated.

Figure 19B:
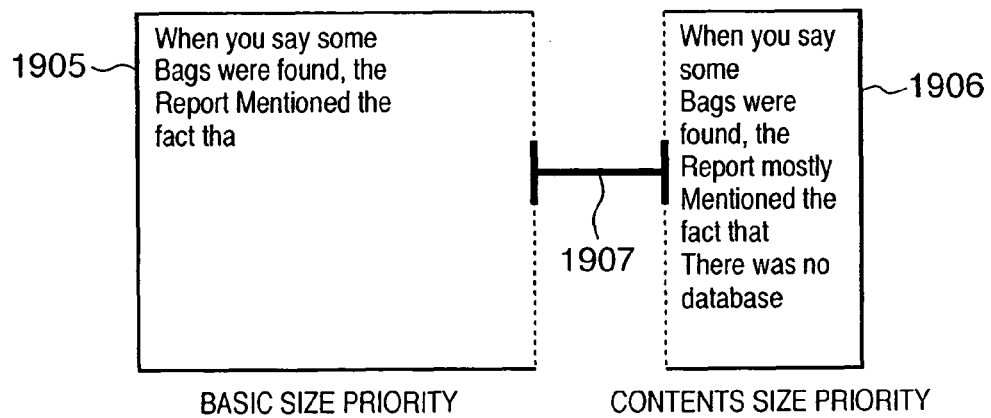

FIG. 19B shows a state after layout processing is executed in the state in FIG. 19A. A container 1905 corresponds to the container 1901 in FIG. 19A. A container 1906 corresponds to the container 1902 in FIG. 19A. Since the container 1902 pulls the container 1901 in accordance with the contents size, the container 1901 receives the pulling force 1904 from the container 1902. Since the layout method with basic size priority is set for the container 1901, the container size is not changed normally. In this case, however, size change processing is executed to make the size of the container 1902 equal to the contents size, and the container 1906 is formed. The container 1901 changes to the container 1905 due to the pulling force 1904 generated at this time. The basic size is changed not only by the above-described pushing force but also by the pulling force.

Figure 20A:
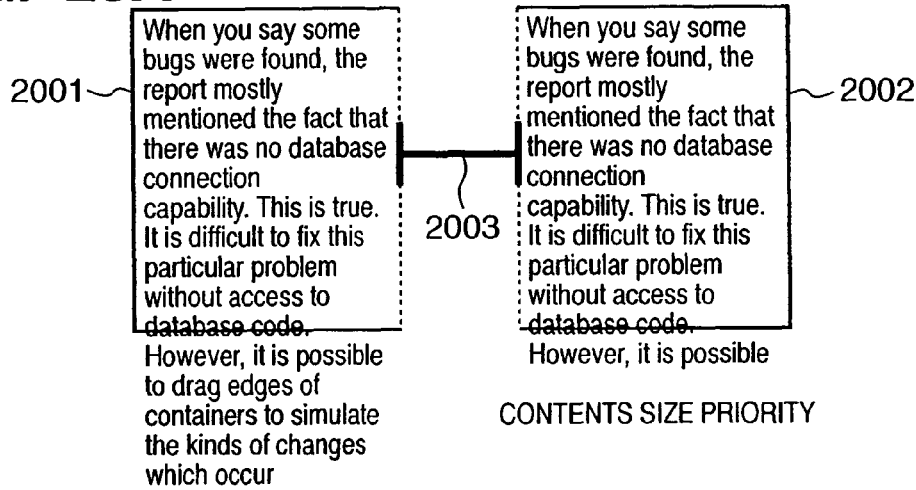
FIGS. 20A to 20C are views for explaining layout processing when a container with basic size priority and a container with contents size priority are associated.

Referring to FIG. 20A, containers 2001 and 2002 are present, which are associated by a link 2003. The layout method with basic size priority is set for the container 2001, and the layout method with contents size priority is set for the container 2002. In the container 2001, the upper, left, and lower edges are fixed, and the right edge is flexible. In the container 2002, the upper, right, and lower edges are fixed, and the left edge is flexible. Text contents are inserted in the containers 2001 and 2002. The text flows from the upper left to the lower right of each container. The size of the text content inserted in the container 2001 is larger than the size of the container 2001. Hence, the text is pushed off the container 2001. In the layout method with basic size priority, in such a case, the container size is changed in order to entirely display the content. The size of the text content inserted in the container 2002 is also larger than the size of the container 2002. Hence, the text is pushed off the container 2002. In the layout method with contents size priority, the priority is given to the contents size. For this reason, the size of the container 2002 is changed in accordance with the contents size.

Figure 20B:
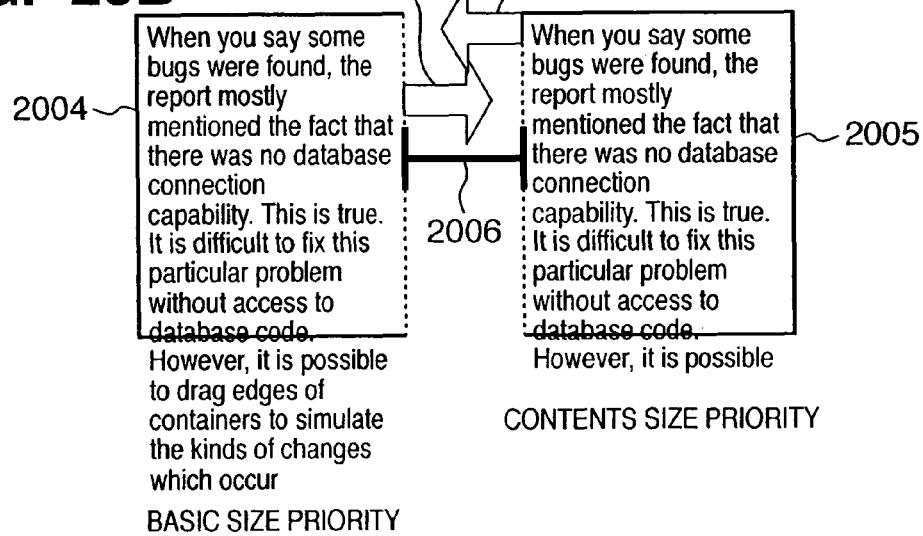

FIG. 20B shows a state immediately before layout processing is executed in the state in FIG. 20A. A container 2004 corresponds to the container 2001 in FIG. 20A. A container 2005 corresponds to the container 2002. An influence generated between the containers is indicated by arrows 2007 and 2008. Since the two containers push each other, the arrows 2007 and 2008 indicate pushing forces. Although the layout method with basic size priority is set for the container 2004, the container size is going to increase because the contents size is large. Since the layout attribute with contents size priority is set for the container 2005, the container 2005 is going to become large in accordance with the contents size. Since pushing occurs between the containers, negotiation processing is executed between the containers 2004 and 2005 to calculate the layout. Reference numeral 2009 indicates that layout collision occurs between the containers 2004 and 2005. In this case, the container 2004 is going to change its size in the direction of the arrow 2007, and the container 2005 is going to change its size in the direction of the arrow 2008. Since the two containers push each other, collusion occurs.

Figure 20C:
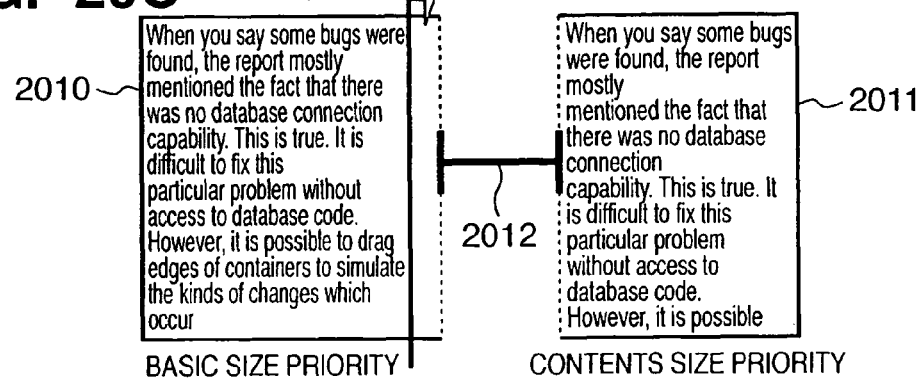

FIG. 20C shows a state after layout processing is executed in the state in FIG. 20B. A container 2010 indicates a state after the size of the container 2004 in FIG. 20B is changed. A container 2011 indicates a state after the size of the container 2005 in FIG. 20B is changed. Since the difference between the container size and the contents size (overflow amount) is larger in the container 2004, the container 2004 increases its size (in the direction of an arrow 2013) and changes to the container 2010 as a result of negotiation processing. Reference numeral 2014 denotes an original (basic) size position of the right edge of the container 2010. This position is the same as that of the right edge of the container 2004 in FIG. 20B. Since the right edge of the container 2010 after layout calculation is located on the right edge of the position 2014, it can be recognized that the container size has increased. This makes it possible to reduce the container 2011. In addition, the font of the contents in the containers 2010 and 2011 is reduced in order to display the entire contents in the containers.

[Example of Layout Processing when Containers with Basic Size Priority are Associated]

FIGS. 21A to 21C are views showing an example of layout processing when containers with basic size priority are associated.

Referring to FIG. 21A, containers 2101 and 2102 are present, which are associated by a link 2103. The layout method with basic size priority is set for the containers 2101 and 2102. In the container 2101, the upper, left, and lower edges are fixed, and the right edge is flexible. In the container 2102, the upper, right, and lower edges are fixed, and the left edge is flexible. Text contents are inserted in the containers 2101 and 2102. The text flows from the upper left to the lower right of each container. The size of the text content inserted in the container 2101 is larger than the size of the container 2101. Hence, FIG. 21A shows that the text is pushed off the container 2101. In such a case, the container size is changed in order to entirely display the content. On the other hand, the size of the text content inserted in the container 2102 is smaller than the size of the container 2102. Since the priority is given to the basic size, the container 2102 does not change its size.

FIG. 21B shows a state immediately before layout processing is executed in the state in FIG. 21A. A container 2104 corresponds to the container 2101. A container 2105 corresponds to the container 2102. The container 2104 is going to increase the container size because the contents size is large, although the layout method with basic size priority is set. The container 2105 is going to maintain its size. However, since the container 2105 is pushed by the container 2104, negotiation processing is executed between the containers 2104 and 2105. Reference numeral 2109 indicates that layout collision occurs between the containers 2104 and 2105. In this case, the container 2104 is going to change its size in the direction of an arrow 2107, and the container 2105 is going to change its size in the direction of an arrow 2108 (because the contents size is smaller than the container size).

FIG. 21C shows a state after layout processing is executed in the state in FIG. 21B. A container 2110 corresponds to the container 2104 after layout calculation. A container 2111 corresponds to the container 2105 after layout calculation. In FIG. 21C, the container 2104 increases its size in the direction of an arrow 2113 and changes to the container 2110. Reference numeral 2114 denotes an original (basic) size position of the right edge of the container 2110. This position is the same as that of the right edge of the container 2104 in FIG. 21B. Since the right edge of the container 2110 after layout calculation is located on the right edge of the position 2114, it can be recognized that the container size has increased. On the other hand, the container 2105 decreases its size and changes to the container 2111.

[Example Wherein Container Size does not Change]

Figure 22A:
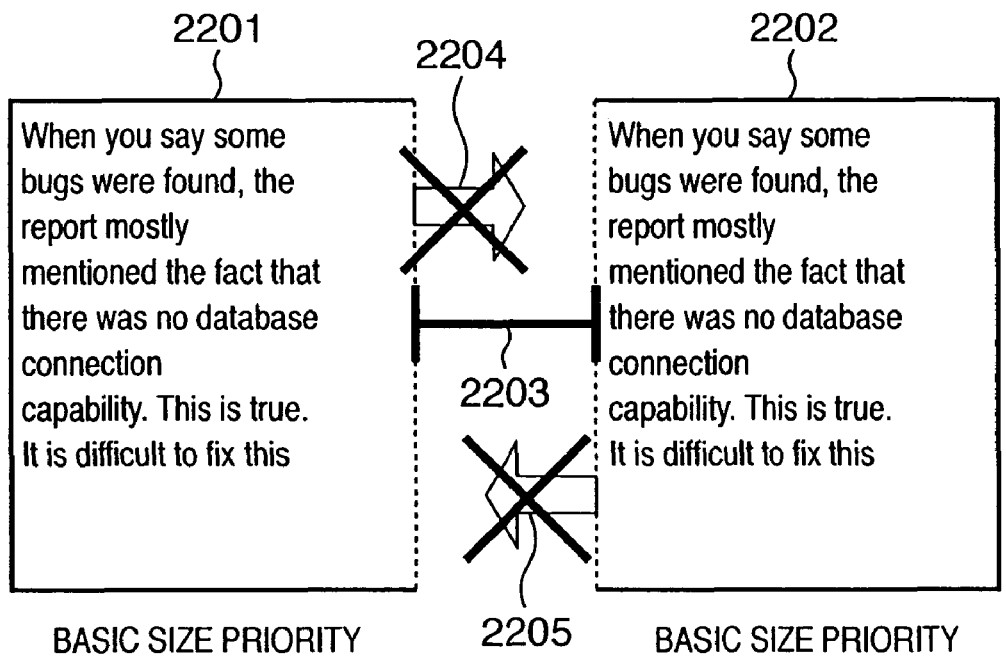
FIGS. 22A and 22B are views showing an example in which the container sizes do not change in layout processing according to the embodiment.
Figure 22B:
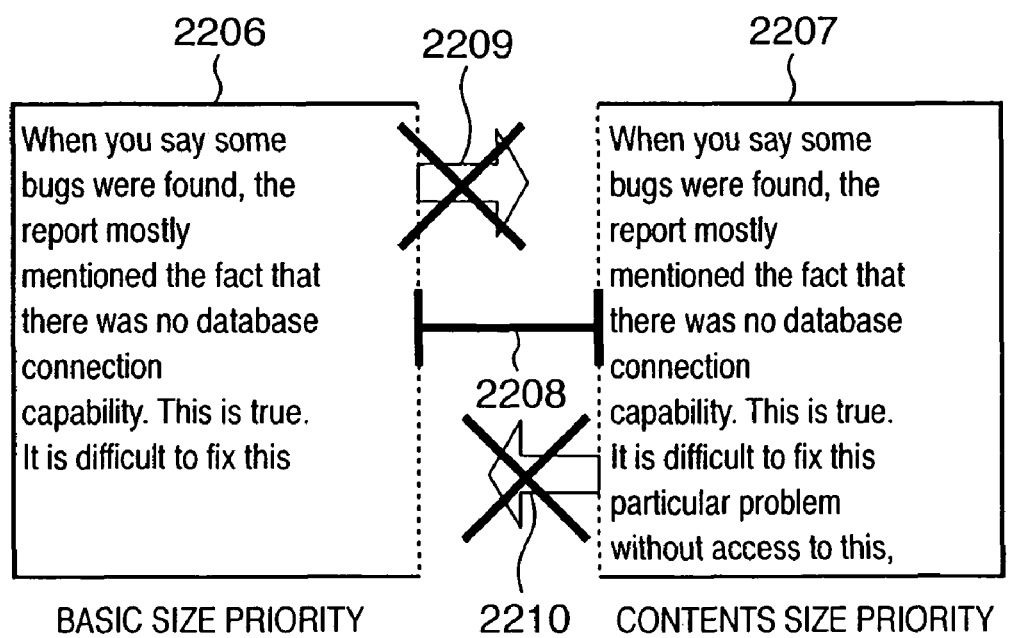

FIG. 22A shows a case wherein containers to which the layout method with basic size priority is applied are associated, and their container sizes do not change at all. FIG. 22B shows a case wherein a container to which the layout method with basic size priority is applied and a container to which the layout method with contents size priority is applied are associated, and their container sizes do not change at all.

FIG. 22A shows containers 2201 and 2202 to which the layout method with basic size priority is applied. These containers are associated by a link 2203. In the container 2201, the upper, left, and lower edges are fixed, and the right edge is flexible. In the container 2202, the upper, right, and lower edges are fixed, and the left edge is flexible. Text contents are inserted in the containers 2201 and 2202. The text flows from the upper left to the lower right of each container. The sizes of the text contents inserted in the containers 2201 and 2202 are smaller than the container sizes. The two containers for which the basic size priority is set do not change their sizes. No influence indicated by an arrow 2204 or 2205 is generated, and layout calculation by negotiation processing is not executed. In such a case, the container sizes do not change, and the layout does not change at all.

Referring to FIG. 22B, containers 2206 and 2207 are associated by a link 2208. The layout method with basic size priority is set for the container 2206, and the layout method with contents size priority is set for the container 2207. In the container 2206, the upper, left, and lower edges are fixed, and the right edge is flexible. In the container 2207, the upper, right, and lower edges are fixed, and the left edge is flexible. Text contents are inserted in the containers 2206 and 2207. The text flows from the upper left to the lower right of each container.

The size of the content inserted in the container 2206 is smaller than the container size, and the container size does not change. On the other hand, the size of content inserted in the container 2207 equals the size of the container 2207. Hence, the container size does not change as a result of layout processing with contents size priority. No influence is generated from either the container 2206 or container 2207, and layout calculation by negotiation processing is not executed. In such a case, the container sizes do not change, and the layout does not change at all.

[Example of Layout with Basic Size Priority]

FIGS. 25A to 25D show typical layouts using containers to which the layout method with basic size priority is applied.

FIGS. 25A to 25D show examples wherein left and right containers are moved by the layout method with basic size priority.

Figure 25:
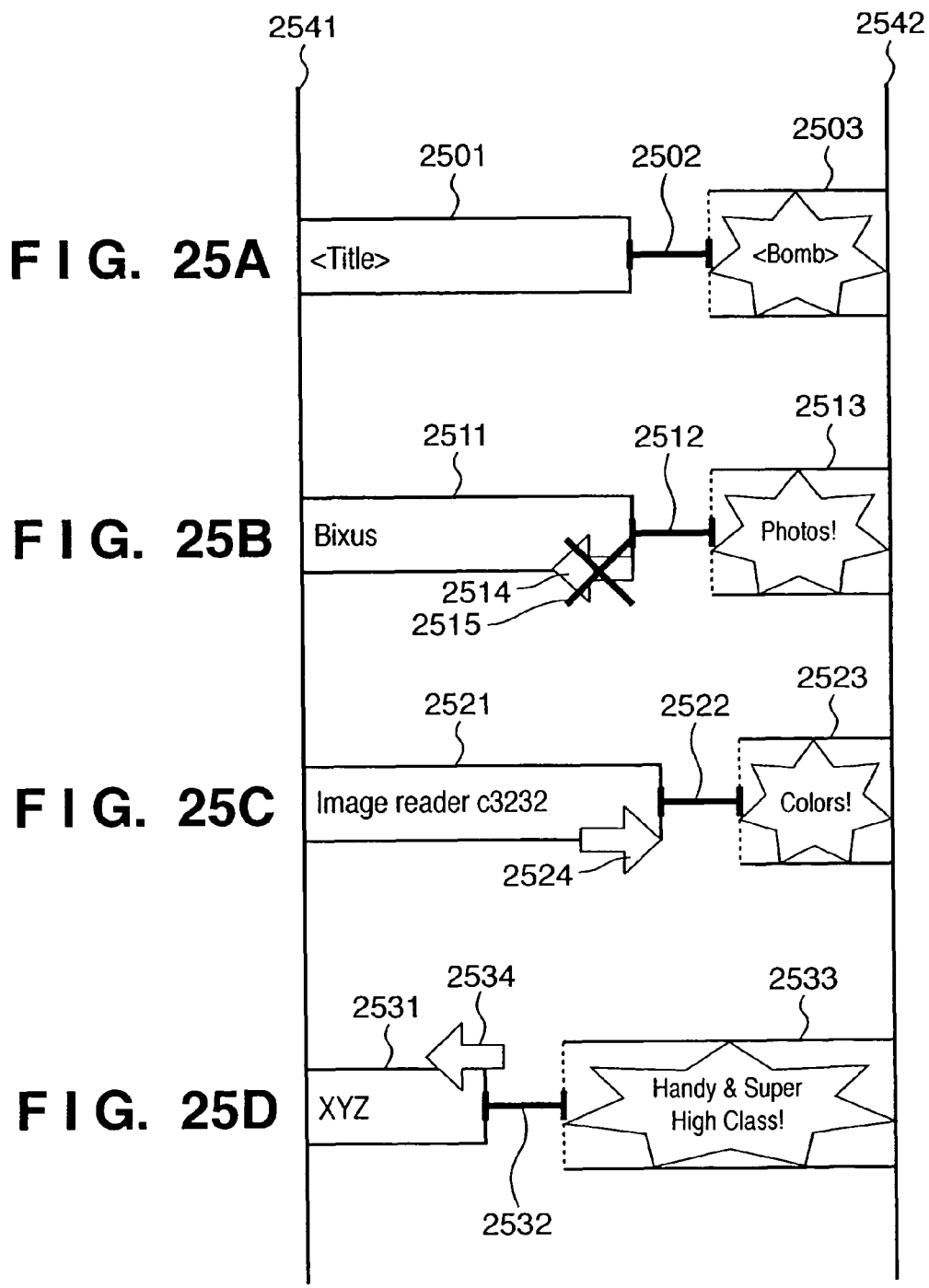
FIGS. 25A to 25D are views showing typical examples of layout processing using containers to which the layout method with basic size priority is applied.

Referring to FIG. 25A, basic size priority is set for a left container 2501 and a right container 2503. A DB field is assigned to each container. The containers are associated by a link 2502. In the container 2501, the upper, lower, and left edges are fixed, and the right edge is flexible. In the container 2503, the upper and lower edges are fixed, and the left edge is flexible. The position of the left edge of the container 2501 and the position of the right edge of the container 2503 are fixed. Lines 2541 and 2542 indicate that the positions are fixed in FIGS. 25A to 25D, although the lines are not displayed on the actual layout. The layout method when contents data are actually inserted will be described below with reference to FIGS. 25B to 25D.

FIG. 25B shows a state wherein contents are inserted from the database in the containers set as shown in FIG. 25A. A character string (contents data) "Bixus" is inserted in a left container 2511. A character string (contents data) "Photos!" is inserted in a right container 2513. The size of the content inserted in the container 2513 equals the container size. The size of the content inserted in the left container 2511 is smaller than the size of the container 2511. Hence, the container sizes do not change. When the layout method with basic size priority is employed, a user's desire to maintain the layout (arrangement and visual impression) created first as much as possible is satisfied. More specifically, for example, the user arranges the title (2501) and bomb (2503) on the left and right edges of the layout and sets background colors to the respective containers. In such a layout with color schemes, since the containers are arranged in consideration of the balance and visual impression on paper, the user wants to maintain the layout if possible. Hence, even when the container edges are flexible, the sizes are not changed as much as possible, thereby meeting the user's desire.

FIG. 25C shows a state wherein "Image reader c3232" is inserted from the database in the left container, and "Colors!" is inserted in the right container. In this case, the content inserted in a container 2521 on the left edge is large, the container size is desired to change and increase. When the container size increases, a "pushing force" 2524 to push a linked link 2523 is generated. Although the font may be shrunk, the "title" is preferably laid out while maintaining its font size as much as possible. The position of the left edge of the container 2521 and the position of the right edge of the link 2523 are fixed. For this reason, to display the two inserted contents in original sizes, the containers must be laid out over the boundaries 2541 and 2542. To prevent this, the sizes of the contents (font sizes here) inserted in the containers 2521 and 2523 are reduced. As described above, the title preferably maintains its original font size as much as possible, layout calculation is done such that the change amount (reduction ratio) is minimized.

FIG. 25D shows a state wherein "XYZ" is inserted from the database in the left container, and "Handy & Super High Class!" is inserted in the right container. In this example, the content inserted in a container 2533 on the right edge is large, and the container 2533 pushes a container 2531. Even in this case, the font of the content inserted in the container 2533 may be shrunk. However, the user wants to appeal the contents of the bomb too and display it as large as possible. Hence, it is preferable to push the container 2531 and use a space formed by pushing the container 2531. The layout method with basic size priority is an effective method capable of coping with all the above-described cases.

Figure 28:
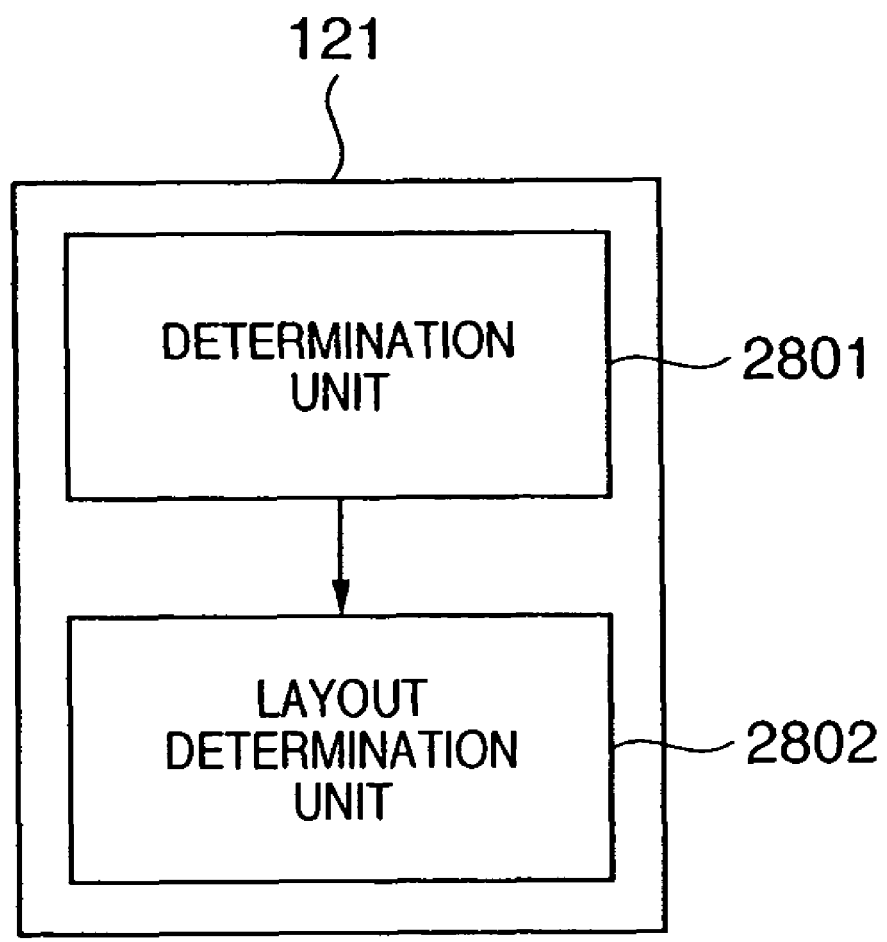
FIG. 28 is a block diagram showing a functional arrangement example of layout editing processing by a layout editing application.

FIG. 28 shows the functional arrangement of the above-described automatic layout system (layout editing application 121).

Referring to FIG. 28, the layout editing application 121 implements dynamically changing the layout of a template having a plurality of data areas in accordance with contents data to be inserted in each of the plurality of data areas. A determination unit 2801 determines whether to change the size of the data area (container) from the standard size in setting the layout to adapt the data area to the size of the contents data inserted in the data area. When the determination unit 2801 determines to change the size of the data area from the standard size, a layout determination unit 2802 determines the size of the data area in accordance with the size of the contents data inserted in the data area. When the determination unit 2801 determines not to change the size of the data area from the standard size, the layout determination unit 2802 determines the size of the data area by using the standard size. For a data area for which a first layout attribute (basic size priority) is set, the determination unit 2801 determines that the size of the data area should not be changed from the standard size when the size of contents data inserted in the data area is smaller than the standard size of the data area and the data area is not influenced by a data area associated with the data area by a link. For a data area for which a second layout attribute (contents size priority) is set, the determination unit 2801 determines that the size of the data area should be changed from the standard size when contents data having a size different from the set standard size is inserted in the data area or when the data area is influenced by a data area associated by a link.

As described above, according to this embodiment, the layout editing application 121 can determine whether the size of contents data and the standard size of a container are different. According to this embodiment, a layout attribute (basic size priority or contents size priority) set for each container can also be recognized. When contents data is inserted, whether the standard size set for each container needs to be changed is determined on the basis of the contents data inserted in the container, the influence (pushing force or pulling force) from a container associated by a link, and the layout attribute. If it is determined that the size needs to be changed, the container size is changed in accordance with the size of contents data inserted in the data area. If it is determined that the size need not be changed, the standard size is set as the container size.

When the user executes layout, basic size priority or contents size priority can be assigned to each container so that a layout on which the user's desire is reflected better can be created. That is, the layout method with basic size priority or the layout method with contents size priority can be designated for each container. For this reason, the number of options in the layout method increases, the user's intension can be reflected, and a desired layout can be created.

In the layout method with basic size priority, the container size in layout is maintained as much as possible. When the size is broken, or the container is pushed or pulled, calculation is done in accordance with the contents size. That is, this method allows the user to appropriately set, for each container, the functions of both of a container with a fixed size and a container with a flexible size of the prior art. As described above, the layout method with basic size priority is a breakthrough to automatically determine the presence/absence of size change on the basis of the size of a content inserted from the database or the influence of another container.

The object of the present invention can also be achieved by supplying a storage medium (or recording medium) which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is also achieved when software program codes for implementing the functions of the above-described embodiment are distributed through a network and stored in a storage means such as a hard disk or memory of a system or apparatus or a storage medium such as a CD-RW or CD-R, and the computer (or CPU or MPU) of the system or apparatus reads out and executes the program codes stored in the storage means or storage medium.

As described above, according to the present invention, the size of a data area set in layout can appropriately be maintained, and layout processing which reflects a user's desire in layout design can be implemented.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-252897 filed on Aug. 31, 2004, which is hereby incorporated by reference herein.

What is claimed is:

1. An information processing apparatus for executing layout processing of changing a layout of a template having a plurality of data areas in accordance with contents data to be assigned in each of the plurality of data areas, comprising:
    displaying means for displaying the plurality of data areas on a screen;
    first setting means for setting a standard size for a first data area;
    second setting means for setting a first layout attribute indicating that size of the first data area arranged with the standard size is not changed when the size of the contents data assigned in the first data area is smaller than the standard size of the first data area;
    layout means for, in a case where the first layout attribute has been set to the first data area,
        (a) maintaining the standard size of the first data area when the size of the contents data assigned in the first data area is smaller than the standard size of the first data area and a size of a second data area associated with the first data area is not changed, (b) changing the size of the first data area when the size of the contents data assigned in the first data area is smaller than the standard size of the first data area and the size of the second data area associated with the first data area is changed, or (c) expanding the size of the first data area when the size of the contents data assigned in the first data area is larger than the standard size of the first data area, wherein the second setting means sets a second layout attribute indicating contents size priority for the first data area, and the layout means, in a case where the second layout attribute has been set to the first data area, changes the size of the first data area even if the size of the contents data assigned by the first setting means is smaller than the standard size of the first data area and there is not change a size of the second data area associated with the first data area when contents data having a size different from the set standard size is inserted in the second data area or when the second data area is influenced by a data area associated by a link.

2. The apparatus according to claim 1, further comprising third setting means for individually setting one of the first layout attribute and the second layout attribute for each of the plurality of data areas.

3. The apparatus according to claim 2, wherein whether to set a flexible size can be set for each of the plurality of data areas, and when a data area is set to the flexible size, one of the first layout attribute and the second layout attribute can be set for the data area by said second setting means.

4. The apparatus according to claim 3, wherein when a data area for which the first size attribute is set and a data area for which the second layout attribute is set are associated by the link, the layout of the data area for which the second layout attribute is set is changed in accordance with the size of the assigned contents data.

5. A control program stored on a non-transitory computer-readable medium, which causes a computer to execute layout processing of changing a layout of a template having a plurality of data areas in accordance with contents data to be assigned in each of the plurality of data areas, the layout processing comprising:

a first setting step of setting a standard size for a first data area;

a second setting step of setting a first layout attribute indicating that size of the first data area arranged with the standard size is not changed when the size of the contents data assigned in the first data area is smaller than the standard size of the first data area;

a layout step of, in a case where the first layout attribute has been set to the first data area, (a) maintaining the standard size of the first data area when the size of the contents data assigned in the first data area is smaller than the standard size of the first data area and a size of a second data area associated with the first data area is not changed, (b) changing the size of the first data area when the size of the contents data assigned in the first data area is smaller than the standard size of the first data area and the size of the second data area associated with the first data area is changed, or (c) expanding the size of the first data area when the size of the contents data assigned in the first data area is larger than the standard size of the first data area, wherein in the second setting step, a second layout attribute indicating contents size priority is set for the first data area, and in the layout step, in a case where the second layout attribute has been set to the first data area, the size of the first data area is changed even if the size of the contents data assigned in the first data area is smaller than the standard size of the first data area and a size of the second data area associated with the first data area is not changed when contents data having a size different from the set standard size is inserted in the second data area or when the second data area is influenced by a data area associated by a link.

6. The program according to claim 5, wherein the layout processing further comprises a third setting step of individually setting one of the first layout attribute and the second layout attribute for each of the plurality of data areas.

7. The program according to claim 6, wherein whether to set a flexible size is set for each of the plurality of data areas, and when a data area is set to the flexible size, one of the first layout attribute and the second layout attribute can be set for the data area in the second setting step.

8. The program according to claim 7, wherein when a data area for which the first layout attribute is set and a data area for which the second layout attribute is set are associated by a link, the size of the data area for which the second layout attribute is set is changed in accordance with the size of the assigned contents data.

* * * * *